(12) United States Patent
Chiou et al.

(10) Patent No.: US 10,082,704 B2
(45) Date of Patent: Sep. 25, 2018

(54) LIQUID CRYSTAL ALIGNMENT AGENT, LIQUID CRYSTAL ALIGNMENT FILM AND LIQUID CRYSTAL DISPLAY ELEMENT HAVING THEREOF

(71) Applicant: Chi Mei Corporation, Tainan (TW)

(72) Inventors: Shin-Rong Chiou, Kaohsiung (TW); Tsung-Pei Tsai, Tainan (TW)

(73) Assignee: Chi Mei Corporation, Tainan (TW)

( * ) Notice: Subject to any disclaimer, the term of this patent is extended or adjusted under 35 U.S.C. 154(b) by 275 days.

(21) Appl. No.: 15/081,966

(22) Filed: Mar. 28, 2016

(65) Prior Publication Data

US 2016/0282676 A1    Sep. 29, 2016

(30) Foreign Application Priority Data

Mar. 27, 2015   (TW) .............. 104109979 A

(51) Int. Cl.
G02F 1/1337        (2006.01)

(52) U.S. Cl.
CPC ...... G02F 1/133723 (2013.01); G02F 1/1337 (2013.01); G02F 1/133711 (2013.01);
(Continued)

(58) Field of Classification Search
CPC ............ G02F 1/133723; G02F 1/1337; G02F 1/133711; G02F 1/13378; G02F 1/133788;
(Continued)

(56) References Cited

U.S. PATENT DOCUMENTS

| 2012/0229744 | A1* | 9/2012 | Hattori et al. | ........... | C08F 2/50 |
| | | | | | 349/124 |
| 2015/0031829 | A1* | 1/2015 | Tsai | .................. | G02F 1/133723 |
| | | | | | 524/600 |

FOREIGN PATENT DOCUMENTS

JP         2005-037654       2/2005

* cited by examiner

Primary Examiner — Ruiyun Zhang
(74) Attorney, Agent, or Firm — JCIPRNET

(57) ABSTRACT

A liquid crystal alignment agent which is capable of forming a liquid crystal alignment film with excellent ultraviolet reliability, the liquid crystal alignment film, and a liquid crystal display element having the same are provided. The liquid crystal alignment agent includes a polymer composition (A) and a solvent (B). The polymer composition (A) is obtained by reacting a mixture, wherein the mixture includes a tetracarboxylic dianhydride component (a) and a diamine component (b). The tetracarboxylic dianhydride component (a) includes a tetracarboxylic dianhydride compound (a-1) represented by formula (1). The diamine component (b) includes a diamine compound (b-1) represented by formula (2) and a diamine compound (b-2) containing the structure represented by formula (3).

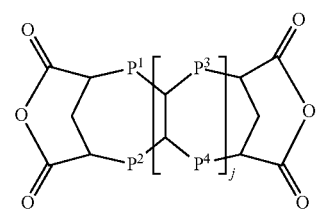

(1)

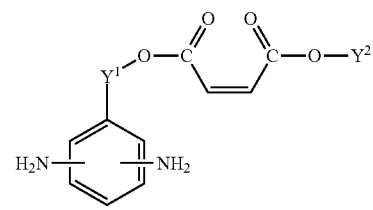

(2)

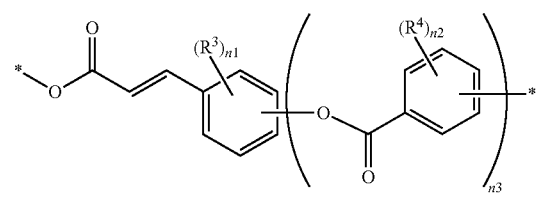

(3)

6 Claims, 1 Drawing Sheet

(52) U.S. Cl.
CPC . *G02F 2001/133742* (2013.01); *Y10T 428/10* (2015.01); *Y10T 428/1005* (2015.01); *Y10T 428/1018* (2015.01); *Y10T 428/1023* (2015.01)

(58) Field of Classification Search
CPC ........ G02F 2001/133738; G02F 2001/133742; C08L 79/08; C08G 73/1042; Y10T 428/10; Y10T 428/1005; Y10T 428/1018; Y10T 428/1023; C08J 2379/08
USPC ........ 428/1.1, 1.2, 1.25, 1.26; 349/123, 130, 349/132; 528/353, 350; 524/600
See application file for complete search history.

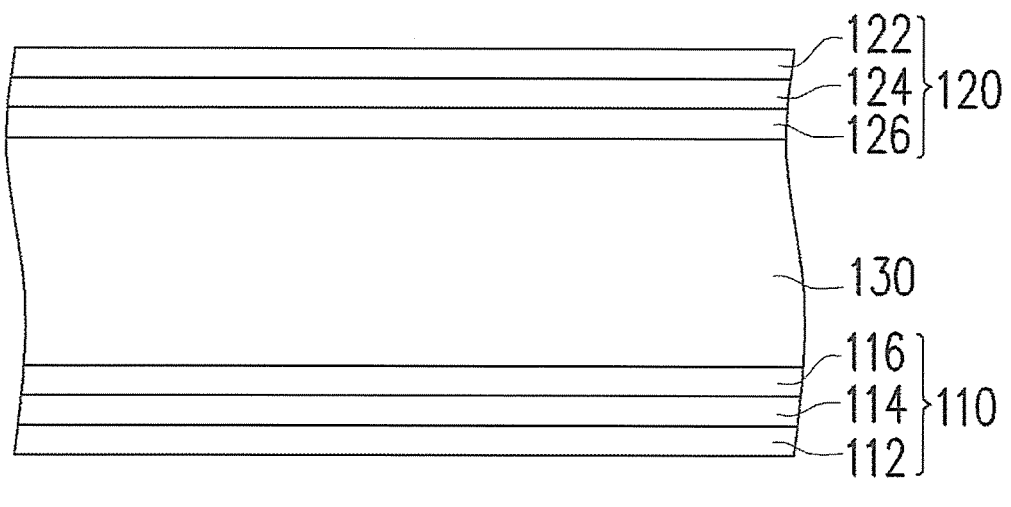

LIQUID CRYSTAL ALIGNMENT AGENT, LIQUID CRYSTAL ALIGNMENT FILM AND LIQUID CRYSTAL DISPLAY ELEMENT HAVING THEREOF

CROSS-REFERENCE TO RELATED APPLICATION

This application claims the priority benefit of Taiwan application Ser. No. 104109979, filed on Mar. 27, 2015. The entirety of the above-mentioned patent application is hereby incorporated by reference herein and made a part of this specification.

BACKGROUND

Field of the Invention

The present invention relates to a liquid crystal alignment agent, a liquid crystal alignment film and a liquid crystal display element having thereof. More particularly, the present invention relates a liquid crystal alignment agent that can form a liquid crystal alignment film having good UV reliability, a liquid crystal alignment film formed by the liquid crystal alignment agent, and a liquid crystal display element comprises the liquid crystal alignment film.

Description of Related Art

The liquid crystal display is widely applied in, for example, television and various monitors. An LCD display element having the following types of liquid crystal cell is known: twisted nematic (TN)-type, super-twisted nematic (STN)-type, in-plane switching (IPS)-type, and fringe field switching (FFS)-type changing the electrode structures of IPS-type and increasing brightness by increasing the aperture ratio of the display element component . . . etc.

The following is a known method for aligning the liquid crystal of liquid crystal cells: an organic film such as a liquid crystal alignment film is formed on the surface of a substrate, and a cloth material such as rayon is used to rub the surface of the organic film in a certain direction; silicon oxide is deposited on the surface of the substrate diagonally via vapor deposition; and a Langmuir-Blodgett (LB) method is used to form a monomolecular film having a long-chain alkyl group. In particular, from the viewpoint of substrate size, uniformity of liquid crystal alignment, treatment time, and treatment costs, a rubbing treatment is most commonly used.

However, if liquid crystal alignment is performed by using a rubbing treatment, dust may be adhered to the surface of the alignment film due to dust or static electricity generated during the process, thus causing poor display. In particular, for a substrate having a thin film transistor (TFT) element, the generated static electricity causes damage to the circuit of the TFT element, thus causing reduced yield. Moreover, for the liquid crystal display element becoming more and more highly delicate in the future, with the high densification of the pixels, the surface of the substrate becomes uneven, and therefore it is difficult to perform a uniform rubbing treatment.

As a result, to avoid such undesired situation, a photoalignment method (such as Japanese Patent Laid-Open 2005-037654) providing liquid crystal alignment capability by irradiating polarized or non-polarized radiation on a photosensitive thin film is known. The patent literature provides a repeating unit having conjugated enone and a liquid crystal alignment agent having an imide structure. Therefore, static electricity and dust are not generated, and therefore uniform liquid crystal alignment can be achieved.

Moreover, in comparison to the rubbing treatment, the method can precisely control the direction of liquid crystal alignment in any direction. Furthermore, by using, for example, a photomask when radiation is irradiated, a plurality of regions having different directions of liquid crystal alignment can be formed on one substrate in any manner.

However, the liquid crystal alignment film has the issue of poor ultraviolet reliability. Specifically, after the liquid crystal alignment film is irradiated by ultraviolet for a period of time, the situation of significantly reduced voltage holding ratio of the liquid crystal display element occurs, thereby causing issues such as reduced contrast of the liquid crystal display element.

Therefore, how to provide a liquid crystal alignment agent capable of forming a liquid crystal alignment film having good ultraviolet reliability such that high voltage holding ratio is still maintained after prolonged ultraviolet irradiation when the liquid crystal alignment film formed thereby is used in a liquid crystal display element is a current issue those skilled in the art urgently need to solve.

SUMMARY

Therefore, an aspect of the present invention provides a liquid crystal alignment agent. The liquid crystal alignment agent comprises a polymer (A) and a solvent (B). The liquid crystal alignment agent can form a liquid crystal alignment film having good UV reliability.

Another aspect of the present invention provides a liquid crystal alignment film. The liquid crystal alignment film is formed by the aforementioned liquid crystal alignment agent.

A further aspect of the present invention provides a liquid crystal display element. The liquid crystal display element includes the aforementioned liquid crystal alignment film.

The liquid crystal alignment agent comprising the polymer (A) and the solvent (B) all of which are described in details as follows.

Polymer (A)

The polymer (A) is selected from the group consisting of polyamic acid, polyimide, polyimide series block-copolymer and a combination thereof. The polyimide series block-copolymer is selected from the group consisting of polyamic acid block-copolymer, polyimide block-copolymer, polyamic acid-polyimide block-copolymer and a combination thereof.

The polyamic acid, polyimide, and polyimide series block-copolymer of the polymer (A) all synthesized by reacting a mixture that includes a tetracarboxylic dianhydride compound (a) and a diamine compound (b). The tetracarboxylic dianhydride compound (a), the diamine compound (b) and a method of producing the polymer (A) all of which are described in details as follows.

Tetracarboxylic Dianhydride Compound (a)

The tetracarboxylic dianhydride compound (a) includes a tetracarboxylic dianhydride compound (a-1) having a structure of formula (1) and an other tetracarboxylic dianhydride compound (a-2).

Tetracarboxylic Dianhydride Compound (a-1)

The tetracarboxylic dianhydride compound (a-1) has a following structure of formula (1):

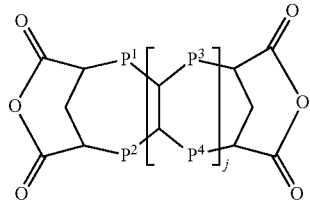

(1)

in the formula (1), $P^1$, $P^2$, $P^3$ and $P^4$ respectively are a single bond or a methylene group; j is an integer of 1 to 3. In the formula (1), j is preferably 1 to 2, and more preferably 1.

In the tetracarboxylic dianhydride compound (a-1) represented by formula (1), specific examples for which j represents 1 include, but are not limited to, bicyclo[3.3.0]octane-2,4,6,8-tetracarboxylic dianhydride (compound represented by formula (1-1)), bicyclo[4.3.0]nonane-2,4,7,9-tetracarboxylic dianhydride (compound represented by formula (1-2)), bicyclo[4.4.0]decane-2,4,8,10-tetracarboxylic dianhydride (compound represented by formula (1-3)), bicyclo[4.4.0]decane-2,4,7,9-tetracarboxylic dianhydride (compound represented by formula (1-4)), or a combination thereof.

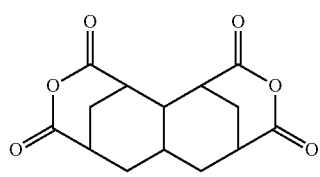

(1-1)

(1-2)

(1-3)

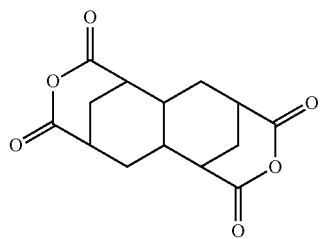

(1-4)

Moreover, in the tetracarboxylic dianhydride compound (a-1) represented by formula (1), specific examples for which j represents 2 include, but are not limited to, tricyclo[6.3.0.0$^{2,6}$]undecane-3,5,9,11-tetracarboxylic dianhydride (compound represented by formula (1-5)).

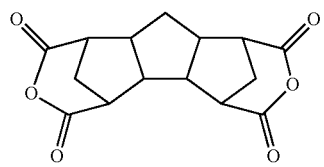

(1-5)

Specific examples of the tetracarboxylic dianhydride compound (a-1) represented by formula (1) preferably include bicyclo[3.3.0]octane-2,4,6,8-tetracarboxylic dianhydride (compound represented by formula (1-1)), bicyclo[4.3.0]nonane-2,4,7,9-tetracarboxylic dianhydride (compound represented by formula (1-2)), tricyclo[6.3.0.0$^{2,6}$]undecane-3,5,9,11-tetracarboxylic dianhydride (compound represented by formula (1-5)), or a combination thereof.

The tetracarboxylic dianhydride compound (a-1) can have an isomeric structure, and one type of isomer can be used or a mixture of an isomer can be used. For example, bicyclo[3.3.0]octane-2,4,6,8-tetracarboxylic dianhydride can have a structure represented by the following formula (1-1-a), formula (1-1-b), or formula (1-1-c).

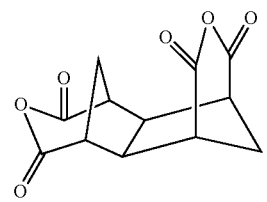

(1-1-a)

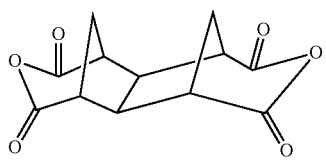

(1-1-b)

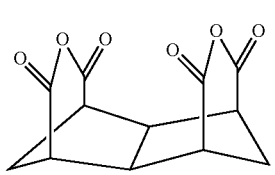

(1-1-c)

Bicyclo[3.3.0]octane-2,4,6,8-tetracarboxylic dianhydride can be synthesized via, for example, the following method. First, 2,5-norbornadiene and dicyclopentadiene are reacted in an autoclave at a temperature of 190° C. for 20 hours to form tetracyclo[6.2.1.1$^{3,6}$.0$^{2,7}$]dodeca-4,9-diene. Then, after an ozonolysis reaction is performed on the obtained compound in methanol in an environment of −30° C., oxidative decomposition is performed in a mixed solvent of formic acid and acetic acid using hydrogen peroxide to form bicyclo[3.3.0]octane-2,4,6,8-tetracarboxylic acid (BOTA). BOTA is added to acetic anhydride, and after a heat treatment, bicyclo[3.3.0]octane-2,4,6,8-tetracarboxylic dianhydride can be obtained. Moreover, BOTA can also be formed performing a potassium permanganate oxidation treatment on tetracyclo[6.2.1.1$^{3,6}$.0$^{2,7}$]dodeca-4,9-diene.

Based on a total usage amount of 100 moles of the tetracarboxylic dianhydride component (a), the usage amount of the tetracarboxylic dianhydride compound (a-1)

can be 5 moles to 50 moles, preferably 8 moles to 45 moles, more preferably 10 moles to 40 moles. When the liquid crystal alignment agent does not contain the tetracarboxylic dianhydride compound (a-1), the liquid crystal alignment film has the issue of poor UV reliability.

Other Tetracarboxylic Dianhydride Compound (a-2)

The tetracarboxylic dianhydride compound (a-2) can be selected from the group consisting of an aliphatic tetracarboxylic dianhydride compound, an alicyclic tetracarboxylic dianhydride compound, an aromatic tetracarboxylic dianhydride compound, the tetracarboxylic dianhydride compound (a-2) having a structure of formula (I-1) to (I-6) and the like.

Specific examples of the aliphatic tetracarboxylic dianhydride compound, the alicyclic tetracarboxylic dianhydride compound, and the aromatic tetracarboxylic dianhydride compound are listed below. However, the invention is not limited to the specific examples.

For example, the aliphatic tetracarboxylic dianhydride compound includes but is not limited tetracarboxylic dianhydride ethane, tetracarboxylic dianhydride butane and the like.

For example, the alicyclic tetracarboxylic dianhydride compound includes but is not limited 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexane tetracarboxylic dianhydride, cis-3,7-dibutylcycloheptyl-1,5-diene-1,2,5,6-tetracarboxylic dianhydride, 2,3,5-tricarboxy cyclopentyl acetic acid dianhydride, dicyclo[2.2.2]-octyl-7-ene-2,3,5,6-tetracarboxylic dianhydride and the like.

For example, the aromatic tetracarboxylic dianhydride compound includes but is not limited 3,4-dicarboxy-1,2,3,4-tetrahydronaphthalene-1-succinic acid dianhydride, pyromellitic dianhydride, 2,2',3,3'-benzophenone tetracarboxylic dianhydride, 3,3',4,4'-benzophenone tetracarboxylic dianhydride, 3,3',4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-diphenylethane tetracarboxylic dianhydride, 3,3',4,4'-dimethyl diphenylsilane tetracarboxylic dianhydride, 3,3',4,4'-tetraphenylsilane tetracarboxylic dianhydride, 1,2,3,4-furan tetracarboxylic dianhydride, 2,3,3',4'-biphenyl ether tetracarboxylic dianhydride, 3,3',4,4'-biphenylether tetracarboxylic dianhydride, 4,4'-bis(3,4-dicarboxyphenoxy)diphenylsulfide dianhydride, 2,3,3',4'-biphenylsulfide tetracarboxylic dianhydride, 3,3',4,4'-biphenylsulfide tetracarboxylic dianhydride, 4,4'-bis(3,4-dicarboxyphenoxyl)diphenylsulfone dianhydride, 4,4'-bis(3,4-dicarboxyphenoxyl)diphenylpropane dianhydride, 3,3',4,4'-perfluoroisopropylidene diphenyl dicarboxylic dianhydride, 2,2'3,3'-biphenyl tetracarboxylic dianhydride, 2,3,3',4'-biphenyl tetracarbxylic dihydrate, 3,3',4,4'-biphenyl tetracarboxylic dianhydate, bis(phthalic acid)phenylphosphine oxide dianhydride, p-phenylene-bis(triphenyl phthalic acid)dianhydride, m-phenylene-bis(triphenylphthalic acid)dianhydride, bis(triphenyl phthalic acid)-4,4'-diphenyl ether dianhydride, bis(triphenylphthalic acid)-4,4'-diphenyl ether dianhydride, bis(triphenylphthalic acid)-4,4'-diphenyl methane dianhydride, ethylene glycol-bis(anhydrotrimelitate), propylene glycol-bis(anhydrotrimelitate), 1,4-butanediol bis(anhydrotrimelitate), 1,6-hexanediol bis(anhydrotrimelitate), 1,8-octanediol bis(anhydrotrimelitate), 2,2-bis(4-hydroxyphenyl)propane-bis(anhydrotrimelitate), 2,3,4,5-tetrahydrofurantetracarboxylic dianhydride, 1,3,3a,4,5,9b-Hexahydro-5-(tetrahydro-2,5-dioxofuran-3-yl)naphtho[1,2-c]furan-1,3-dione, 1,3,3a,4,5,9b-Hexahydro-5-methyl-5-(tetrahydro-2,5-dioxofuran-3-yl)naphtho[1,2-c]furan-1,3-dione, 1,3,3a,4,5,9b-Hexahydro-5-ethyl-5-(tetrahydro-2,5-dioxofuran-3-yl)naphtho[1,2-c]furan-1,3-dione, 1,3,3a,4,5,9b-Hexahydro-7-methyl-5-(tetrahydro-2,5-dioxofuran-3-yl)naphtho[1,2-c]furan-1,3-dione, 1,3,3a,4,5,9b-Hexahydro-7-ethyl-5-(tetrahydro-2,5-dioxofuran-3-yl)naphtho[1,2-c]furan-1,3-dione, 1,3,3a,4,5,9b-Hexahydro-8-methyl-5-(tetrahydro-2,5-dioxofuran-3-yl)naphtho[1,2-c]furan-1,3-dione, 1,3,3a,4,5,9b-Hexahydro-8-ethyl-5-(tetrahydro-2,5-dioxofuran-3-yl)naphtho[1,2-c]furan-1,3-dione, 1,3,3a,4,5,9b-Hexahydro-5-(tetrahydro-2,5-dioxofuran-3-yl)naphtho[1,2-c]furan-1,3-dione, 1,3,3a,4,5,9b-Hexahydro-5,8-dimethyl-5-(tetrahydro-2,5-dioxofuran-3-yl)naphtho[1,2-c]furan-1,3-dione, 5-(2,5-dioxotetrahydrofuran)-3-methyl-3-cyclohexene-1,2-dicarboxylic dianhydride and the like.

The tetracarboxylic dianhydride compound (a) having a structure of formula (I-1) to (I-6) all of which are showed as follows:

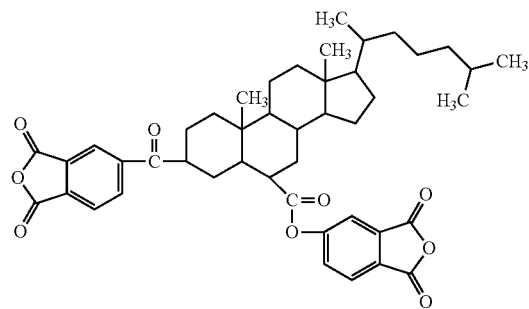

(I-1)

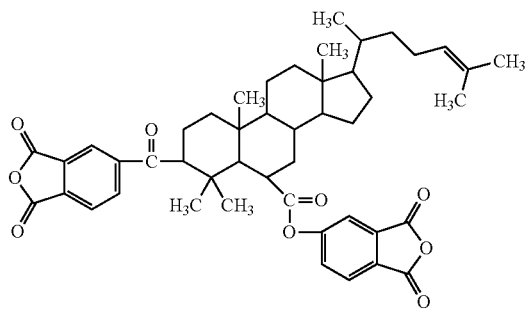

(I-2)

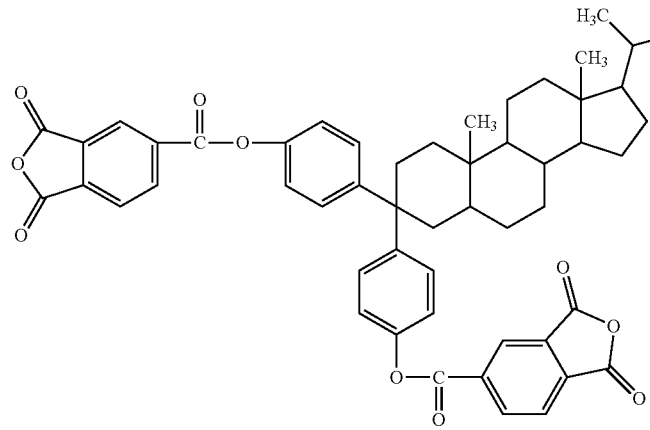
(I-3)

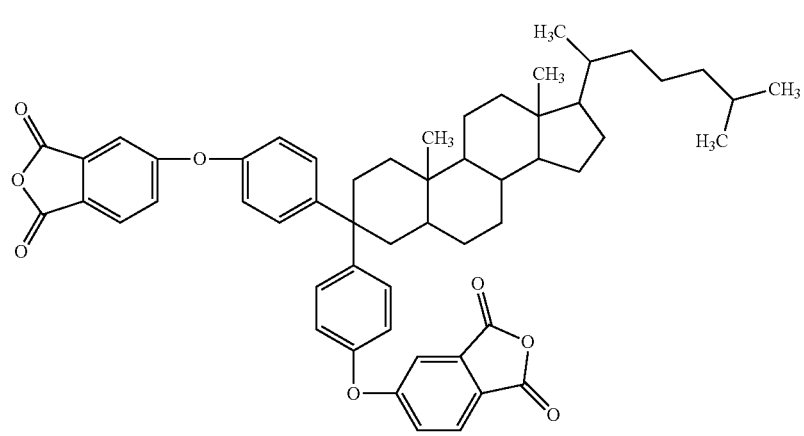
(I-4)

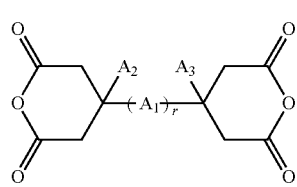
(I-5)

In formula (I-5), $A_1$ is a divalent group having an aromatic group; r is an integer of 1 or 2; $A_2$ and $A_3$ can be the same or different, and $A_2$ and $A_3$ respectively are a hydrogen atom or alkyl group. Preferably, the tetracarboxylic dianhydride compound (a) having a structure of formula (I-5) can be selected from the group consisting of a compound having a structure of formula (I-5-1) to (1-5-3):

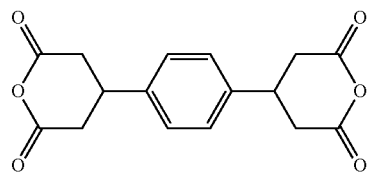
(I-5-1)

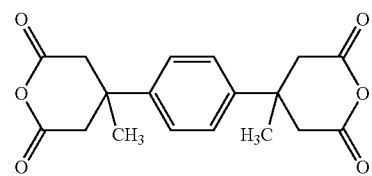
(I-5-2)

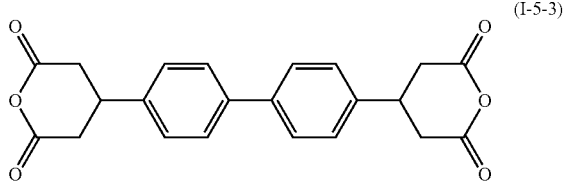
(I-5-3)

-continued (I-6)

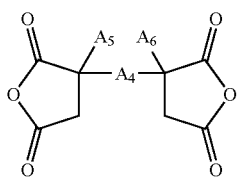

In formula (I-6), $A_4$ is a divalent group having an aromatic group; $A_5$ and $A_6$ can be the same or different, and $A_5$ and $A_6$ respectively are a hydrogen atom or alkyl. Preferably, the tetracarboxylic dianhydride compound (a) having a structure of formula (I-6) can be selected from the group consisting of the compound having a structure of formula (I-6-1):

(I-6-1)

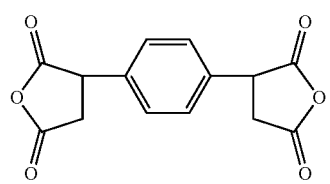

The aforementioned tetracarboxylic dianhydride compound (a-2) can be used alone or a combination two or more. Preferably, the tetracarboxylic dianhydride compound (a-2) includes but is not limited 1,2,3,4-cyclobutane tetracarboxylic dianhydride, 1,2,3,4-cyclopentane tetracarboxylic dianhydride, 2,3,5-tricarboxy cyclopentyl acetic acid dianhydride, 1,2,4,5-cyclohexane tetracarboxylic dianhydride, 3,4-dicarboxy-1,2,3,4-tetrahydronaphthalene-1-succinic acid dianhydride, pyromellitic dianhydride, 3,3',4,4'-benzophenone tetracarboxylic dianhydride, 3,3',4,4'-biphenylsulfone tetracarboxylic dianhydride, a compound represented by formula (I-1), or a combination of the compounds.

Based on a total number of moles of 100 moles of the tetracarboxylic dianhydride component (a), the usage amount of the tetracarboxylic dianhydride compound (a-2) can be 50 moles to 95 moles, preferably 55 moles to 92 moles, more preferably 60 moles to 90 moles.

Diamine Compound (b)

The diamine compound (b) includes a diamine compound (b-1) having a structure of formula (2), a diamine compound (b-2) having a structure of formula (3), and an other diamine compound (b-3).

Diamine Compound (b-1)

The diamine compound (b-1) has a following structure of formula (2):

(2)

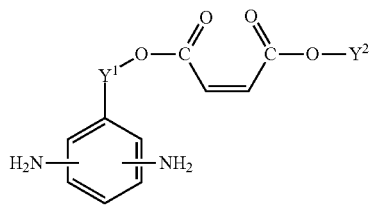

in the formula (2), $Y^1$ is an alkylene group of 1 to 12 carbons. $Y^2$ is a steroid-containing group or a structure of formula (2-1):

(2-1)

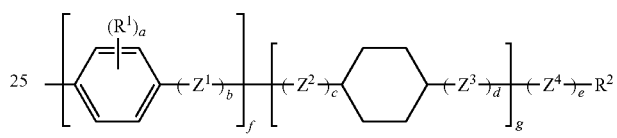

in the formula (2-1), $R^1$ is a hydrogen atom, a fluoro atom or a methyl group. $R^2$ is a hydrogen atom, a fluoro atom, an alkyl group of 1 to 12 carbons, a fluoroalkyl group of 1 to 12 carbons, an alkoxyl group of 1 to 12 carbons, —OCH$_2$F, —OCHF$_2$ or —OCF$_3$. $Z^1$, $Z^2$ and $Z^3$ respectively are a single bond,

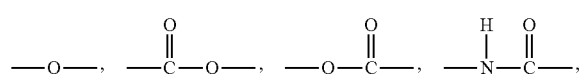

or an alkylene group of 1 to 3 carbons. $Z^4$ is

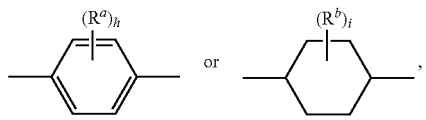

and $R^a$ and $R^b$ respectively are a hydrogen atom, a fluoro atom or a methyl group. h and i respectively are 0, 1 or 2. a is 0, 1 or 2. b, c and d respectively are an integer of 0 to 4. e, f and g respectively are an integer of 0 to 3, and e+f+g≥1.

For example, the diamine compound (b-1) includes following diamine compounds having a structure of formula (I-1) to (I-16):

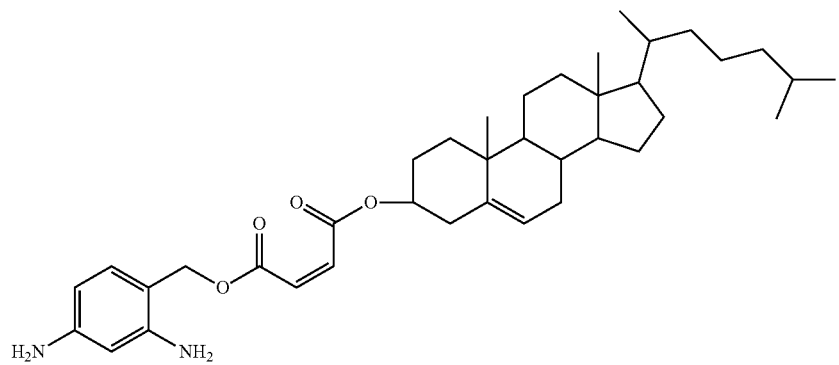
(I-1)
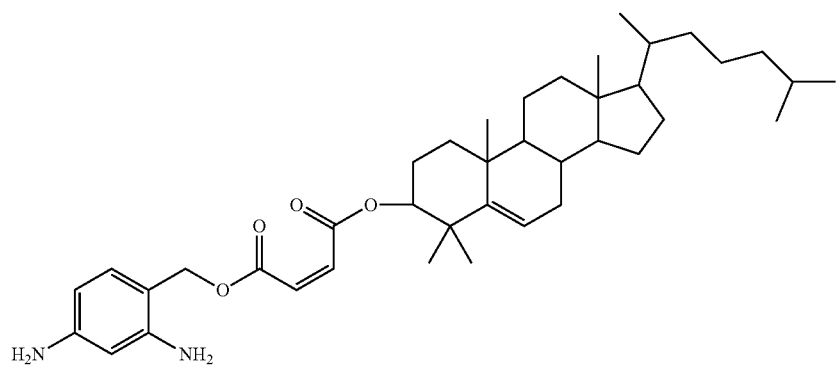
(I-2)
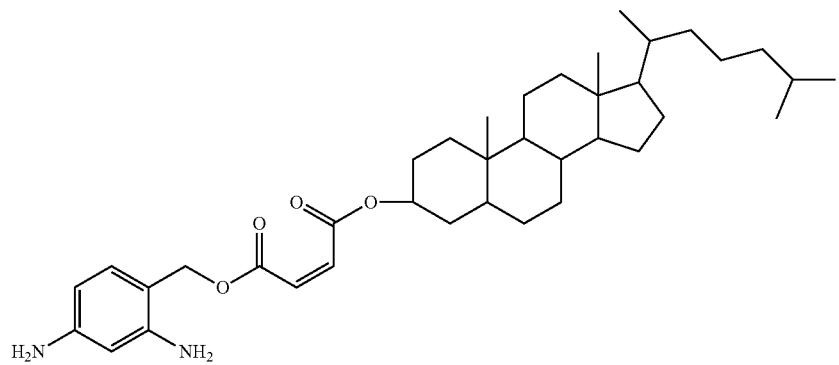
(I-3)
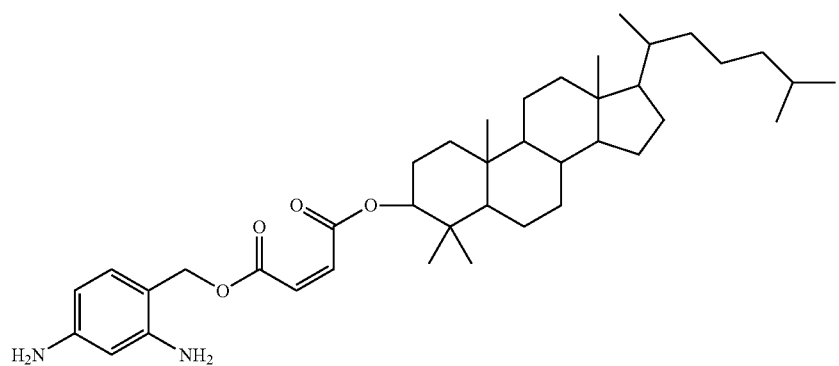
(I-4)

-continued
(I-5)
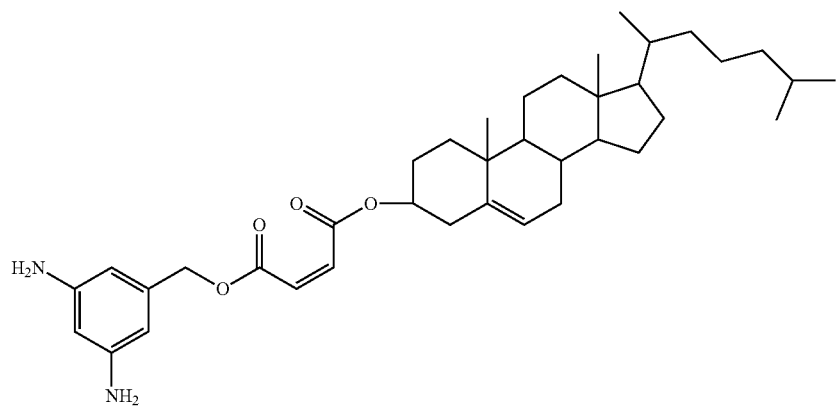
(I-6)
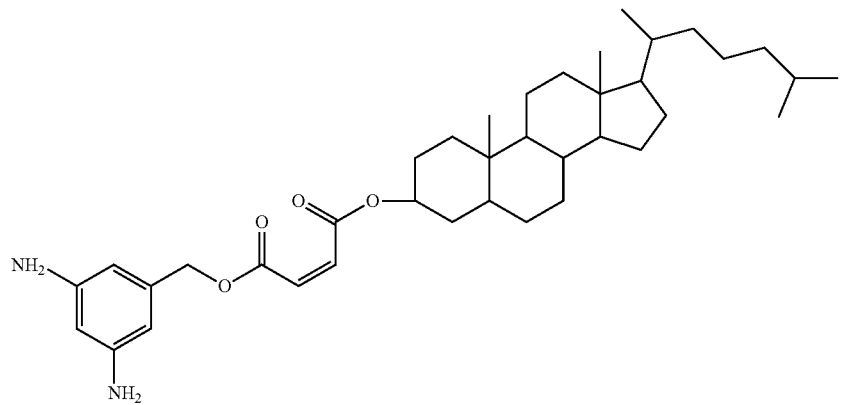
(I-7)
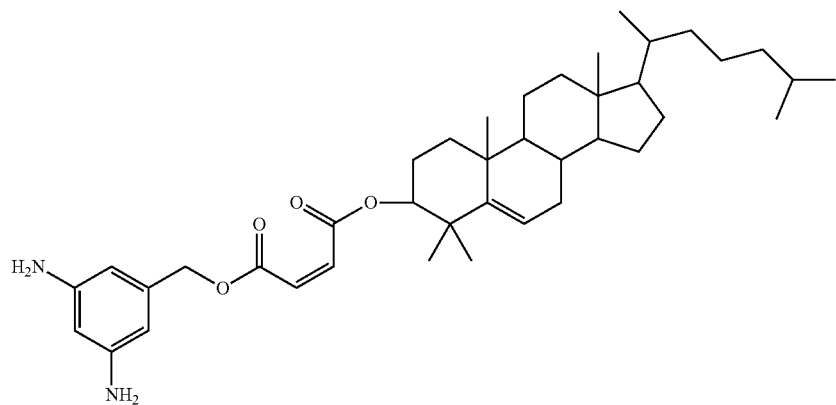
(I-8)
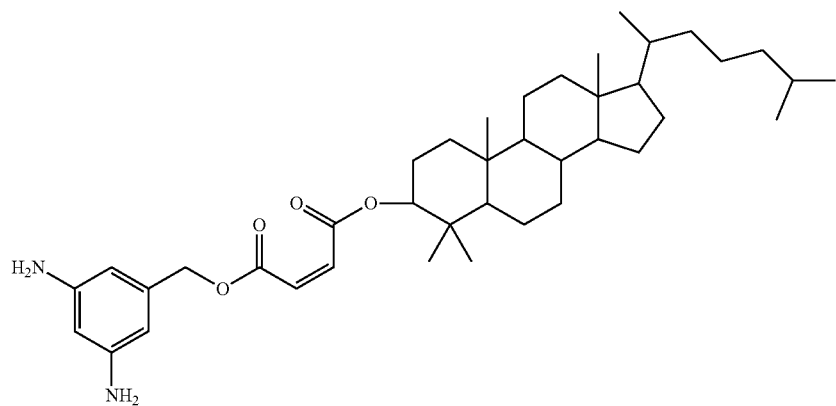

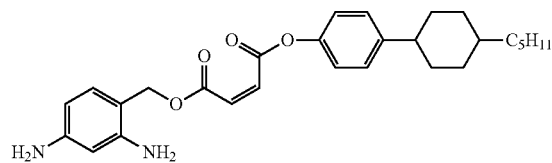
(I-9)
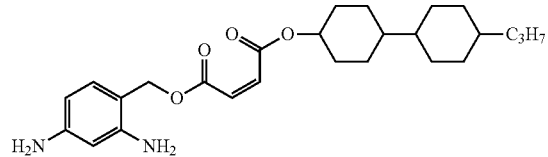
(I-10)
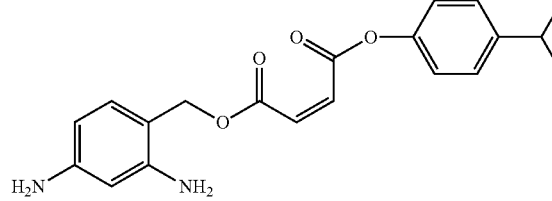
(I-11)
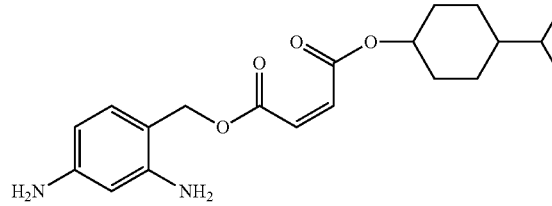
(I-12)
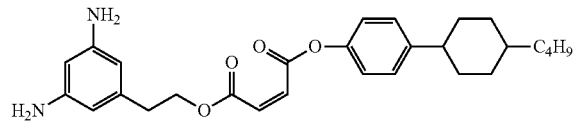
(I-13)
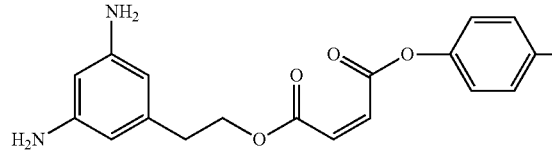
(I-14)
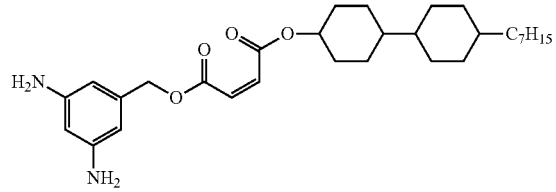
(I-15)
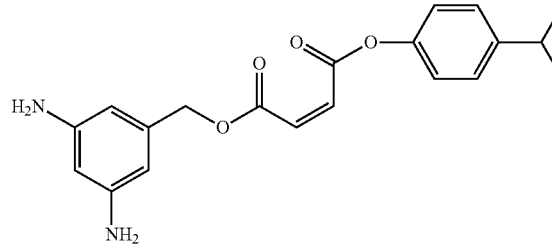
(I-16)

The aforementioned diamine compound (b-1) can be used alone or a combination thereof. The diamine compound (b-1) can be produced by general organic synthetic method. For example, after maleic anhydride is bonded to a steroid-containing compound or a following compound having a structure of formula (I-19) by an addition reaction, dinitrobenzoyl chloride compound is subjected to an esterification reaction with potassium carbonate. Then, a suitable reductant, such as stannic chloride and the like, is added, and a reducing reaction is performed to obtain the aforementioned diamine compound (b-1) having a structure of formula (I-1) to (I-16):

(I-17)

$$HO\left[\left[\underset{(R^1)_a}{\underset{b}{\bigcirc}}-(Z^1)_b\right]_f\left[(Z^2)_c-\underset{}{\bigcirc}-(Z^3)_d\right]_g-(Z^4)_e-R^2\right]$$

in the formula (I-17), $R^1$, $R^2$, $Z^1$, $Z^2$, $Z^3$, $Z^4$, a, b, c, d, e, f and g are the same as above.

The compound having a structure of formula (I-17) can be synthesized by general methods for synthesizing liquid crystal compound, such as Grignard reaction, Friedal-Crafts acylation reaction and the like.

The diamine compound (b-1) represented by formula (I) is preferably at least one selected from the group consisting of diamine compounds represented by formula (I-1), formula (I-6), formula (I-13), formula (I-15), and formula (I-16).

Based on the diamine compound (b) as 100 moles, an amount of the diamine compound (b-1) is 3 moles to 20 moles, preferably is 4 moles to 18 moles, and more preferably is 5 moles to 15 moles.

When the polymer (A) in the liquid crystal alignment agent does not include the diamine compound (b-1) having a structure of formula (I), the liquid crystal alignment agent has a defect of poor UV reliability.

Diamine Compound (b-2)

The diamine compound (b-2) has a following structure of formula (3):

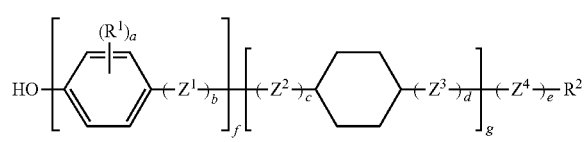

(3)

In formula (3), $R^3$ and $R^4$ each independently represent a $C_1$ to $C_6$ alkyl group, a $C_1$ to $C_6$ alkoxy group, a halogen atom, or a cyano group; n1 and n2 each independently represent an integer of 0 to 4; n3 represents an integer of 0 or 1; and * each independently represents a bonding position.

The diamine compound (b-2) is, for example, at least one selected from the group consisting of a structure represented by formula (3-1) and a structure represented by formula (3-2).

(3-1)

(3-2)

In formula (3-1) and formula (3-2), $R^3$ and $R^4$ each independently represent a $C_1$ to $C_6$ alkyl group, a $C_1$ to $C_6$ alkoxy group, a halogen atom, or a cyano group; $R^5$ and $R^6$ each independently represent a $C_1$ to $C_{40}$ alkyl group or a $C_1$ to $C_{40}$ alkyl group substituted by a fluorine atom; $W^1$, $W^2$, and $W^3$ each independently represent $$-O-, \quad -\overset{O}{\underset{\|}{C}}-, \quad -\overset{O}{\underset{\|}{C}}-O-, \quad -O-\overset{O}{\underset{\|}{C}}-,$$

$$-\underset{R^7}{\overset{|}{N}}-, \quad -\underset{R^7}{\overset{|}{N}}-\overset{O}{\underset{\|}{C}}-, \quad -\overset{O}{\underset{\|}{C}}-\underset{R^7}{\overset{|}{N}}-,$$

$$-\underset{R^7}{\overset{|}{N}}-\overset{O}{\underset{\|}{C}}-O-, \quad -O-\overset{O}{\underset{\|}{C}}-\underset{R^7}{\overset{|}{N}}-,$$

$$-\underset{R^7}{\overset{|}{N}}-\overset{O}{\underset{\|}{C}}-\underset{R^7}{\overset{|}{N}}-, \quad \text{or} \quad -O-\overset{O}{\underset{\|}{C}}-O-,$$

wherein $R^7$ represents a hydrogen atom or a $C_1$ to $C_4$ alkyl group; $X^1$ and $X^2$ each independently represent a methylene group, an arylene group, a divalent alicyclic group, —Si(CH$_3$)$_2$—, —CH═CH—, —C≡C—, a methylene group having a substituent, an arylene group having a substituent, a divalent alicyclic group having a substituent, —Si(CH$_3$)$_2$— having a substituent, or —CH═CH— having a substituent, wherein the substituent is a cyano group, a halogen atom, or a C$_1$ to C$_4$ alkyl group; n1 and n2 each independently represent an integer of 0 to 4; n3 represents an integer of 0 or 1; n4 and n7 each independently represent an integer of 1 to 6; n5 and n8 each independently represent an integer of 0 to 2; n6 represents 0 or 1; and * each independently represents a bonding position.

In formula (3-1) and formula (3-2), specific examples of the C$_1$ to C$_{40}$ alkyl group can include, for example, n-pentyl, n-hexyl, n-heptyl, n-octyl, n-nonyl, n-decyl, n-lauryl, n-dodecyl, n-tridecyl, n-tetradecyl, n-pentadecyl, n-hexadecyl, n-heptadecyl, n-octadecyl, n-nonadecyl, or n-eicosyl. Specific examples of the C$_1$ to C$_{40}$ alkyl group substituted by a fluorine atom can include, for example, 4,4,4-trifluorobutyl, 4,4,5,5,5-pentafluoropentyl, 4,4,5,5,6,6,6-heptafluorohexyl, 3,3,4,4,5,5,5-heptafluoropentyl, 2,2,2-trifluoroethyl, 2,2,3,3,3-pentafluoropropyl, 2-(perfluorobutyl)ethyl, 2-(perfluorooctyl)ethyl, or 2-(perfluorodecyl)ethyl.

The fluorine atom-substituted C$_1$ to C$_{40}$ alkyl group is a C$_1$ to C$_{40}$ alkyl group in which a portion or all of the hydrogen atoms are substituted by fluorine atoms. Preferably, the fluorine atom-substituted C$_1$ to C$_{40}$ alkyl group is a C$_1$ to C$_{20}$ alkyl group in which a portion or all of the hydrogen atoms are substituted by fluorine atoms.

The C$_1$ to C$_{40}$ alkyl group substituted by a fluorine atom is preferably a straight-chain or branched-chain C$_1$ to C$_{16}$ fluoroalkyl group. Moreover, from the viewpoint of exhibiting good liquid crystal alignment property, the C$_1$ to C$_{40}$ alkyl group substituted by a fluorine atom is preferably a C$_1$ to C$_8$ straight-chain fluoroalkyl group. The C$_1$ to C$_{40}$ alkyl group substituted by a fluorine atom is more preferably a C$_3$ to C$_6$ straight-chain fluoroalkyl group such as 2,2,2-trifluoroethyl, 3,3,3-trifluoro-n-propyl, 4,4,4-trifluoro-n-butyl, 4,4,5,5,5-pentafluoro-n-pentyl, or 4,4,5,5,6,6,6-heptafluoro-n-hexyl, and is preferably 2,2,2-trifluoroethyl, 3,3,3-trifluoro-n-propyl, 4,4,4-trifluoro-n-butyl, or 4,4,5,5,5-pentafluoro-n-pentyl.

Specific examples of the diamine compound (b-2) having the structure represented by formula (3-1) include at least one of compounds represented by formula (3-1-1) to formula (3-1-25).

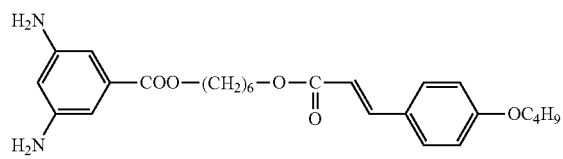

(3-1-1)

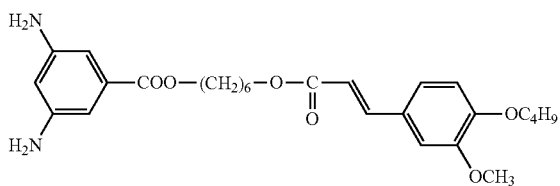

(3-1-2)

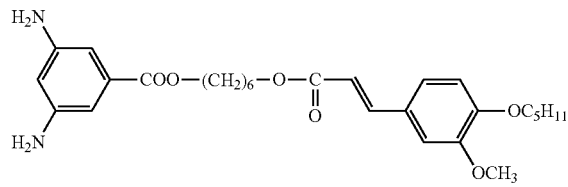

(3-1-3)

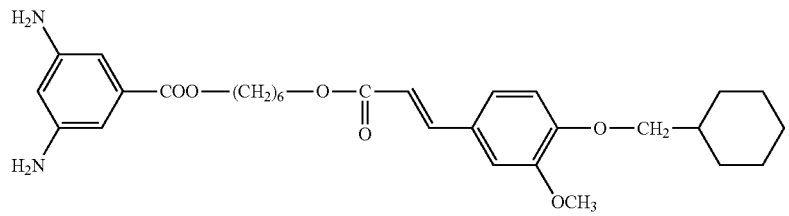

(3-1-4)

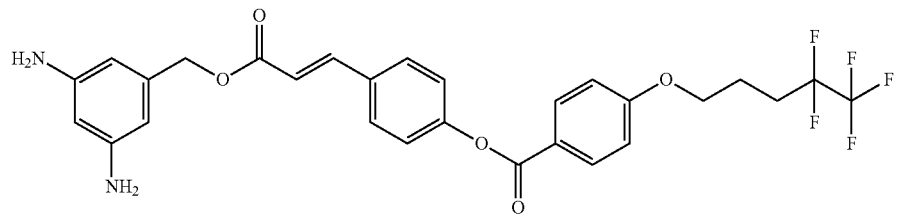

(3-1-5)

-continued
(3-1-6)
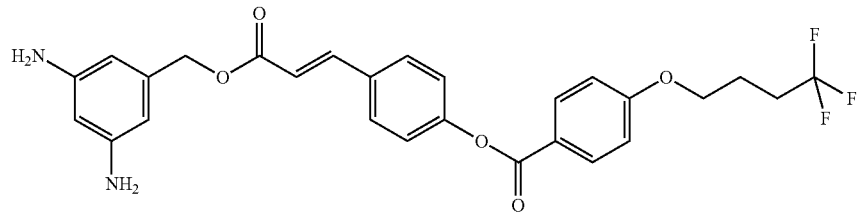
(3-1-7)
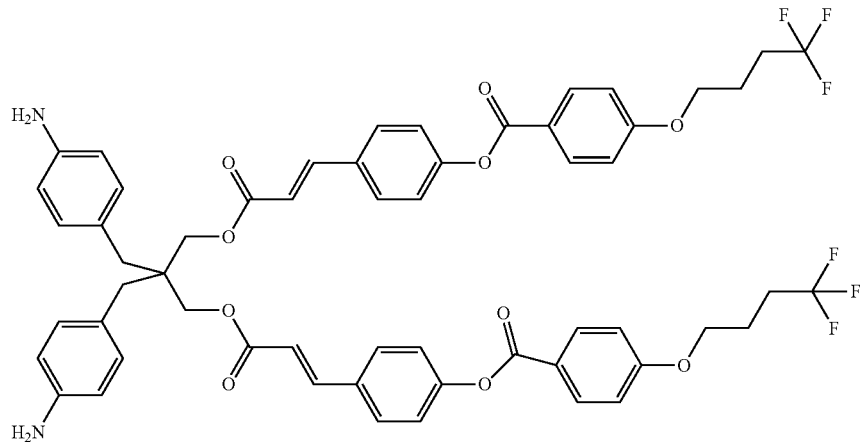
(3-1-8)
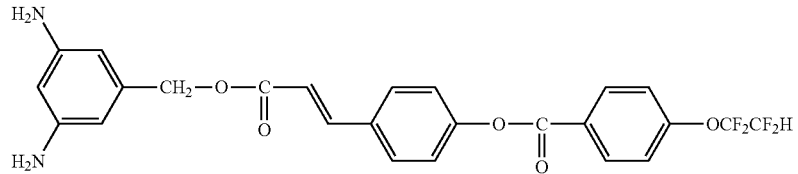
(3-1-9)
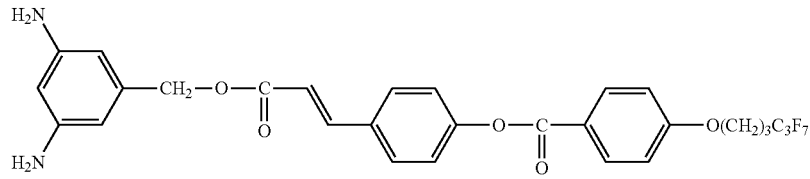
(3-1-10)
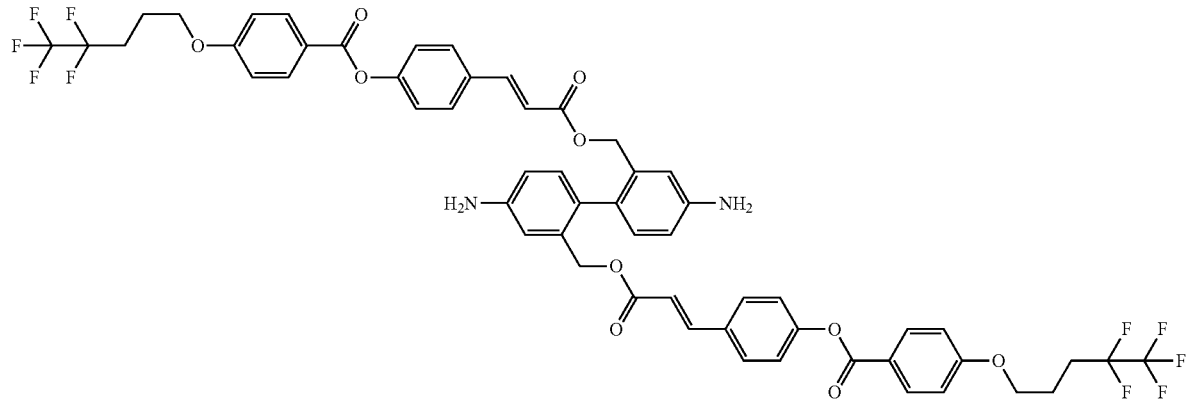

(3-1-11)
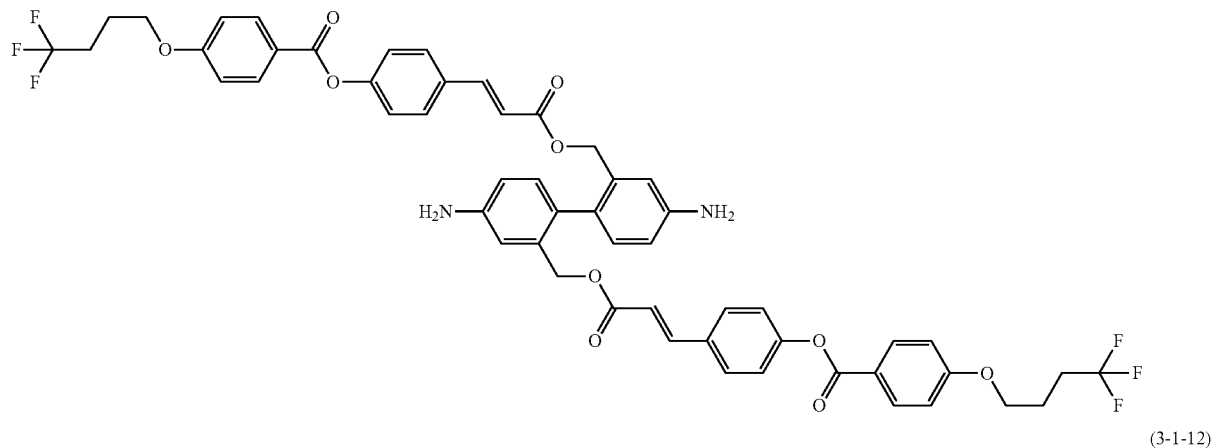
(3-1-12)
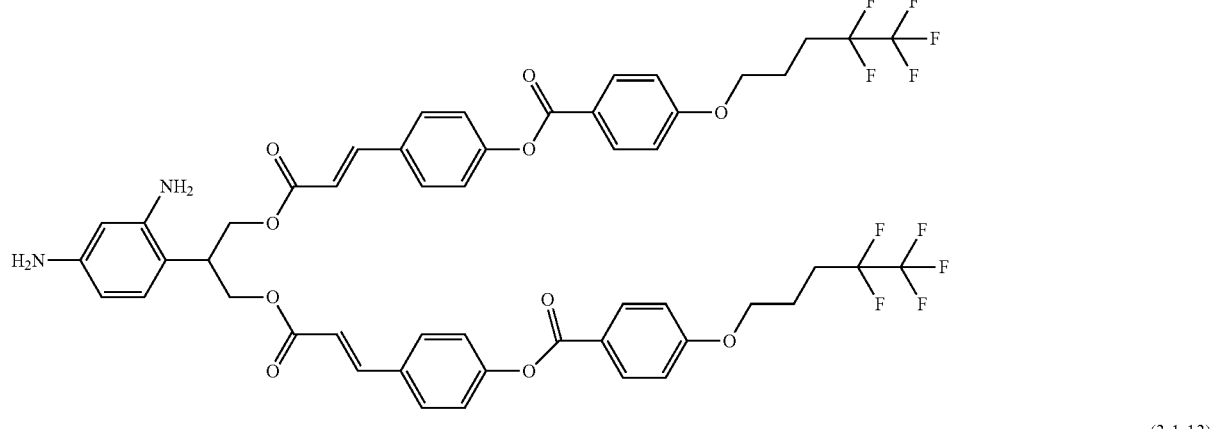
(3-1-13)
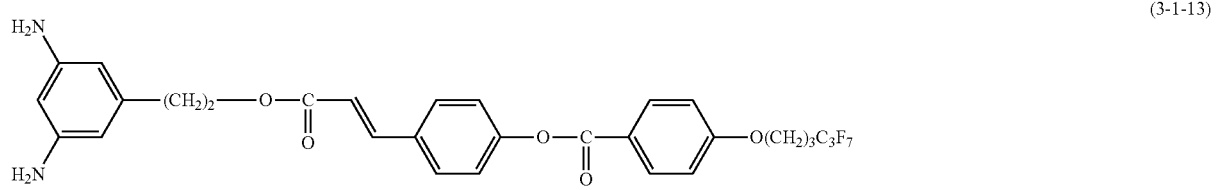
(3-1-14)
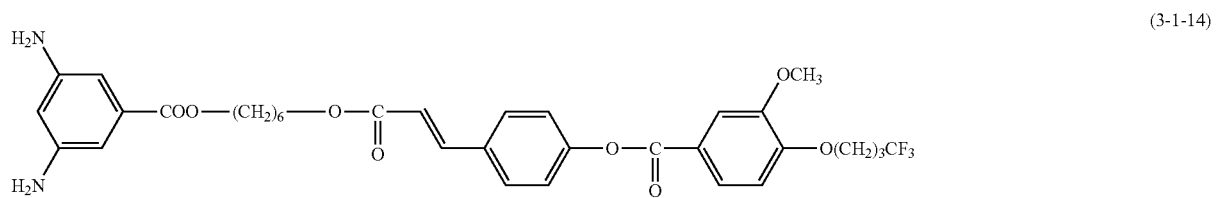
(3-1-15)
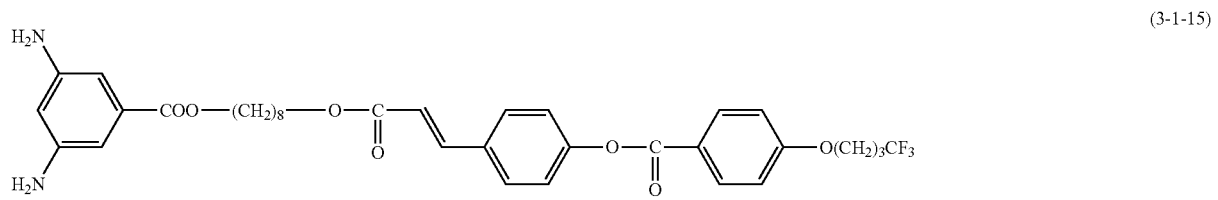

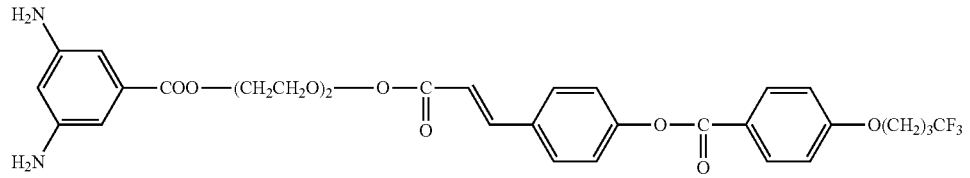
(3-1-17)
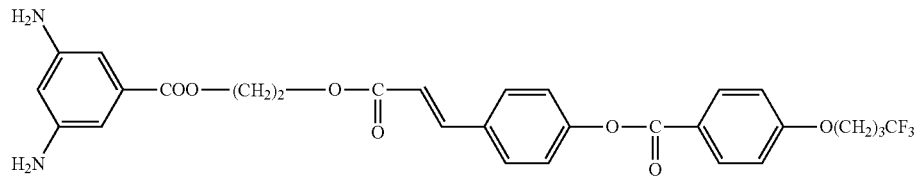
(3-1-18)
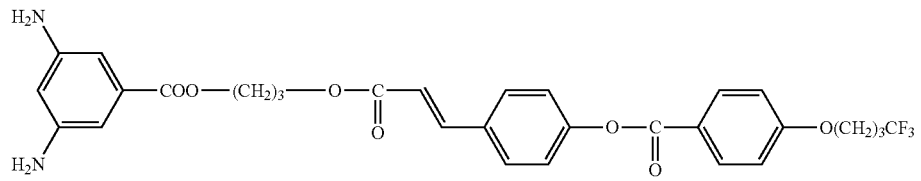
(3-1-19)
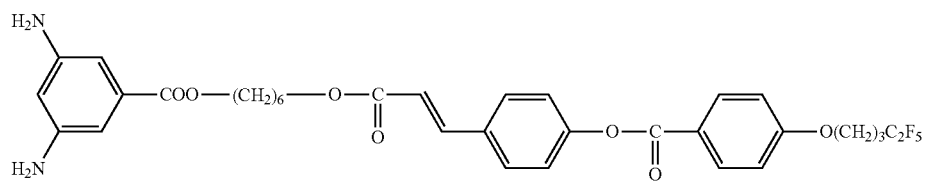
(3-1-20)
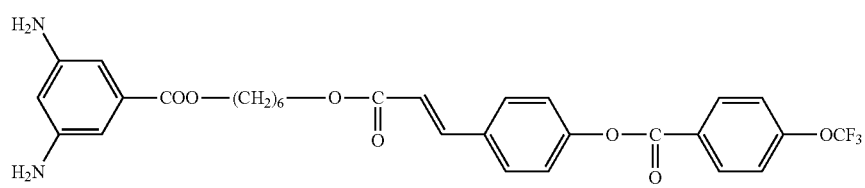
(3-1-21)
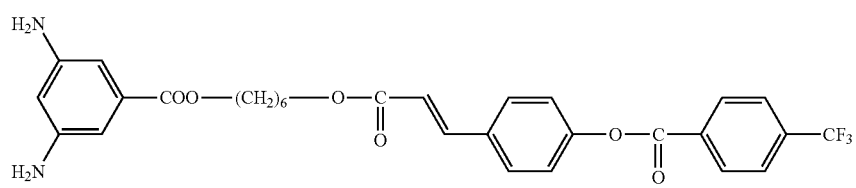
(3-1-22)
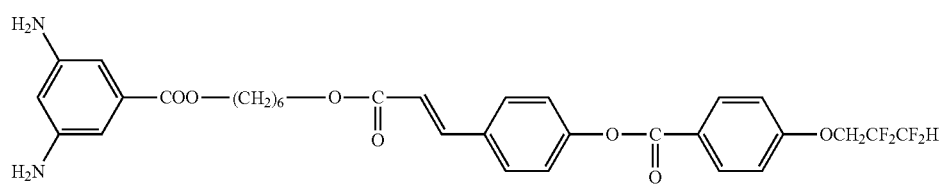
(3-1-23)
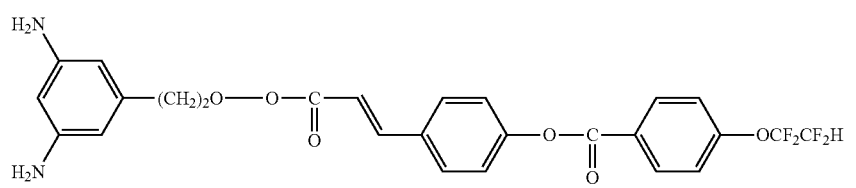
(3-1-24)

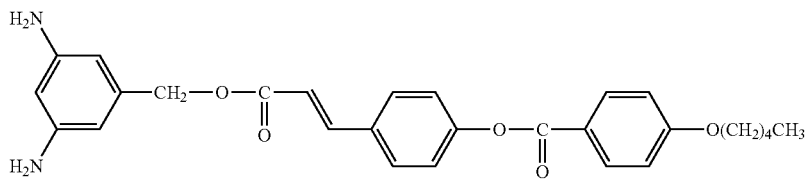

(3-1-25)

Specific examples of the diamine compound (b-2) having the structure represented by formula (3-2) include at least one of compounds represented by formula (3-2-1) to formula (3-2-2).

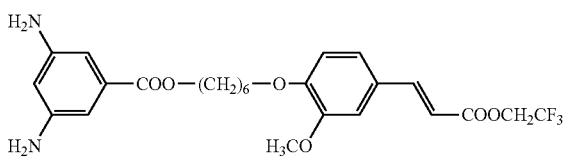

(3-2-1)

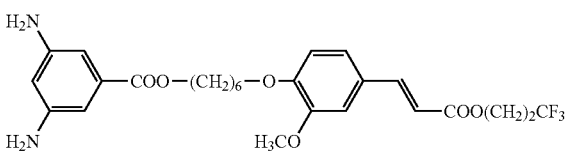

(3-2-2)

The diamine compound (b-2) is preferably at least one selected from the group consisting of diamine compounds represented by formula (3-1-3), formula (3-1-6), formula (3-1-7), and formula (3-2-1).

Based on a usage amount of 100 moles of the diamine component (b), the usage amount of the diamine compound (b-2) can be 10 moles to 80 moles, preferably 15 moles to 75 moles, and more preferably 20 moles to 70 moles. When the liquid crystal alignment agent does not contain the diamine compound (b-2), the liquid crystal alignment film has the issue of poor UV reliability.

Other Diamine Compound (b-3)

The other diamine compound (b-3) includes but is not limited to 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxyl)ethane; 4,4'-diaminodicyclohexylmethane, 4,4'-diamino-3,3'-dimethyldicyclohexylamine, 1,3-diaminocyclohexane, 1,4-diaminocyclohexane, isophoronediamine, tetrahydrodicyclopentadiene diamine, tricyclo(6.2.1.0$^{2,7}$)-undecenoyldimethyl diamine, 4,4'-methylene bis(cyclohexylamine); 4,4'-diaminodiphenylmethane, 4,4'-diaminodiphenylethane, 4,4'-diaminodiphenylsulfone, 4,4'-diaminobenzanilide, 4,4'-diaminodiphenylether, 3,4'-diaminodiphenylether, 1,5-diaminonaphthalene, 5-amino-1-(4'-aminophenyl)-1,3,3-trimethylindane, 6-amino-1-(4-aminophenyl)-1,3,3-trimethylindane, hexahydro-4,7-methanoindanylenedimethylenediamine, 3,3'-diaminobenzophenone, 3,4'-diaminobenzophenone, 4,4'-diaminobenzophenone, 2,2-bis[4-(4-aminophenoxy)phenyl] propane, 2,2-bis[4-(4-aminophenoxy)phenyl] hexafluoropropane, 2,2-bis(4-aminophenyl) hexafluoropropane, 2,2-bis[4-(4-aminophenoxy)phenyl] sulfone, 1,4-bis(4-aminophenoxyl)benzene, 1,3-bis(4-aminophenoxy)benzene, 1,3-bis(3-aminophenoxyl)benzene, 9,9-bis(4-aminophenyl)-10-hydroanthracene, 9,10-bis(4-aminophenyl)anthracene, 2,7-diamino fluorene, 9,9-bis(4-aminophenyl)fluorene, 4,4'-methylene-bis (2-chloroaniline), 4,4'-(p-phenyleneisopropylene)bisaniline, 4,4'-(m-phenylene isopropylene)bisaniline, 2,2'-bis[4-(4-amino-2-trifluoromethyl phenoxy)phenyl]hexafluoropropane, 4,4'-bis[(4-amino-2-trifluoro)phenoxy]octafluorophenyl benzene, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane; and the other diamine compound (b-2) having a structure of formula (III-1) to (III-30):

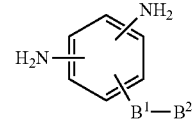

(III-1)

In the formula (III-1), $B^1$ is

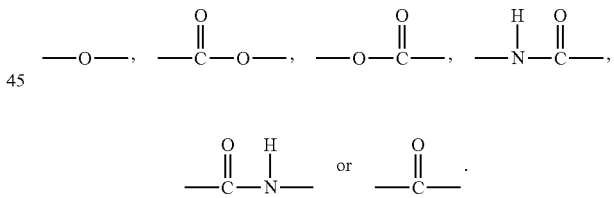

$B^2$ is a steroid-containing group, a trifluoro methyl group, a fluoro group, an alkyl group of 2 to 30 carbons or an monovalent nitrogen-containing cyclic group derived from pyridine, pyrimidine, triazine, piperidine, piperazine and the like.

Preferably, the diamine compound having a structure of formula (III-1) is 2,4-diaminophenyl ethyl formate, 3,5-diaminophenyl ethyl formate, 2,4-diaminophenyl propyl formate, 3,5-diaminophenyl propyl formate, 1-dodecoxy-2,4-diaminobenzene, 1-hexadecoxy-2,4-diaminobenzene, 1-octadecoxy-2,4-diaminobenzene or the diamine compound (b-2) having a structure of formula (III-1-1) to (III-1-6):

(III-1-1) 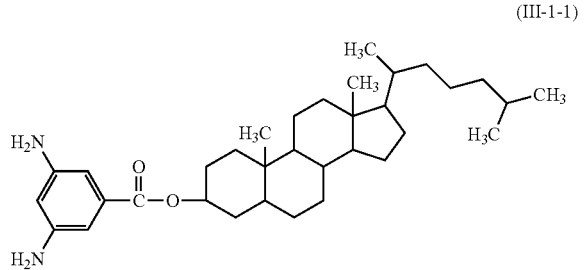

(III-1-2) 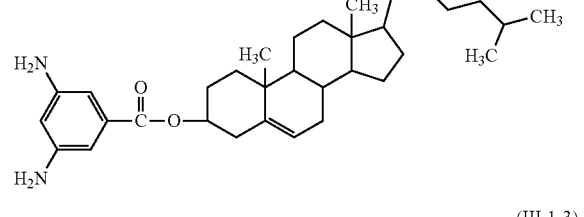

(III-1-3) 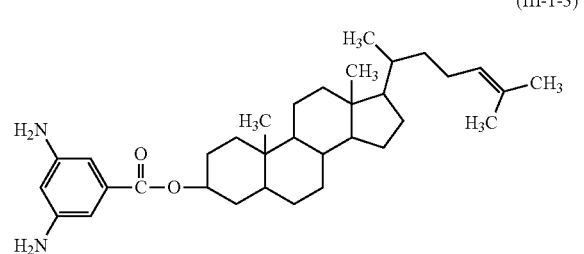

(III-1-4) 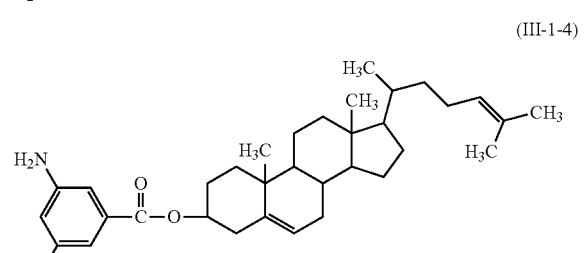

(III-1-5) 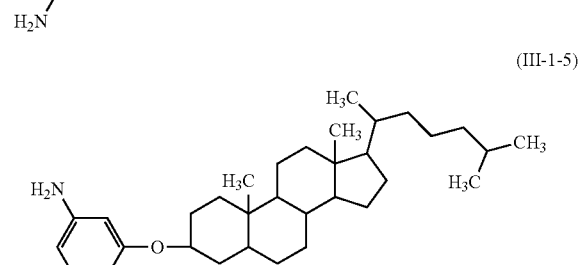

(III-1-6) 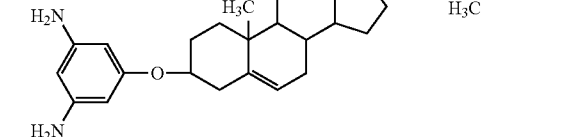

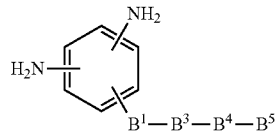 (III-2)

in the formula (III-2), $B^1$ is

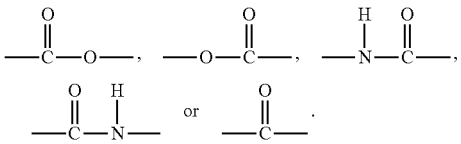

$B^3$ and $B^4$ is a divalent group of an alicyclic ring, an aromatic ring or a heterocyclic ring. $B^5$ is an alkyl group of 3 to 18 carbons, an alkoxyl group of 3 to 18 carbons, a fluoroalkyl group of 1 to 5 carbons, a fluoroalkoxyl group of 1 to 5 carbons, a cyano group or a halogen atom.

Preferably, the other diamine compound having a structure of formula (III-2) is the diamine compound having a structure of formula (III-2-1) to (III-2-13):

(III-2-1) 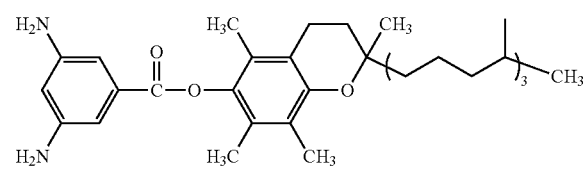

(III-2-2) 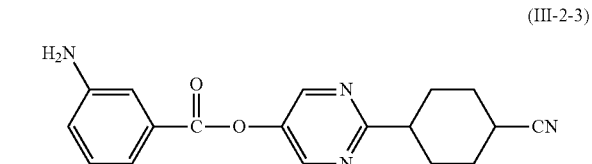

(III-2-3) 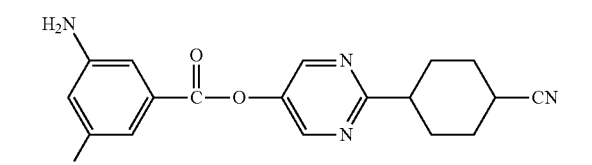

(III-2-4) 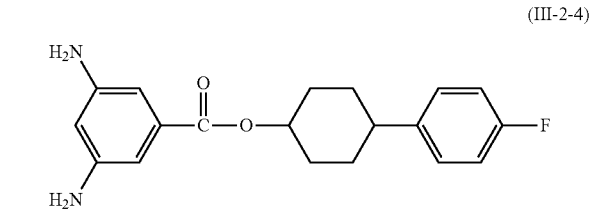

(III-2-5) 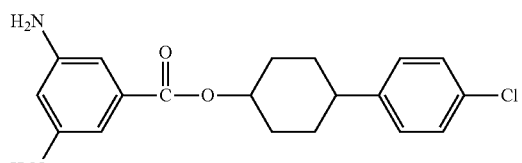

(III-2-6) 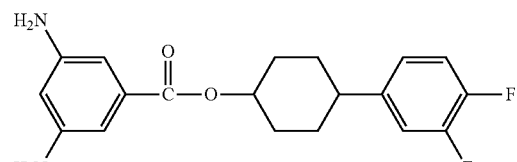

(III-2-7) 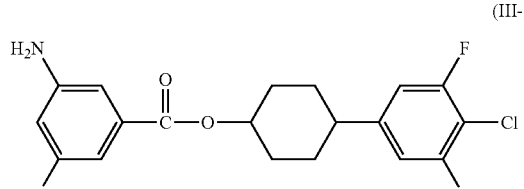

(III-2-8) 

(III-2-9) 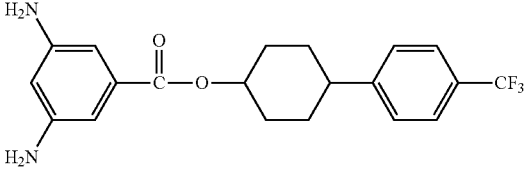

(III-2-10) 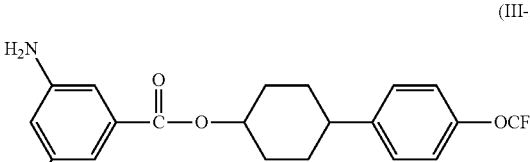

(III-2-11) 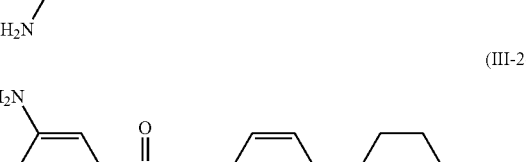

(III-2-12) 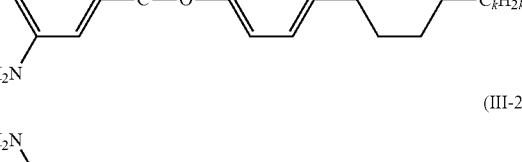

(III-2-13) 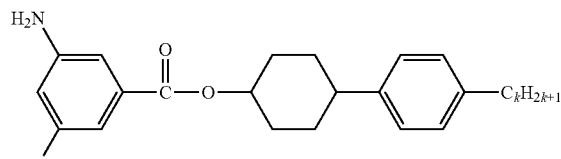

in the formula (III-2-10) to (III-2-13), k is an integer of 3 to 12.

(III-3) 

in the formula (III-3), $B^6$ is a hydrogen atom, an acyl group of 1 to 5 carbons, an alkyl group of 1 to 5 carbons, an alkoxyl group of 1 to 5 carbons, or a halogen atom. In every repeating unit, $B^6$ can be the same or different. u is an integer of 1 to 3.

The diamine compound having a structure of formula (III-3) preferably is selected from the group consisting of (1) when u is 1, such as p-diaminobenzene, m-diaminobenzene, o-diaminobenzene, 2,5-diaminotoluene and the like; (2) when u is 2, such as 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, 4,4'-diamino-2,2'-bis(trichloromethyl)biphenyl and the like; (3) when u is 3, such as 1,4-bis(4'-aminophenyl)benzene and the like, and more preferably is p-diaminobenzene, 2,5-diaminotoluene, 4,4'-diaminobiphenyl, 3,3'-dimethoxy-4,4'-diaminobiphenyl or 1,4-bis(4'-aminophenyl)benzene.

(III-4) 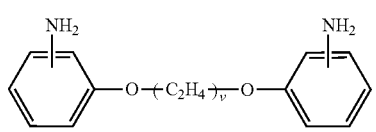

In the formula (III-4), v is an integer of 2 to 12.

(III-5) 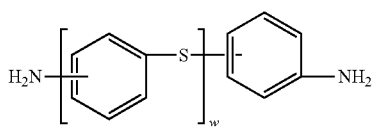

In the formula (III-5), w is an integer of 1 to 5. Preferably, the formula (III-5) is selected from 4,4'-diamino-diphenyl-sulfide.

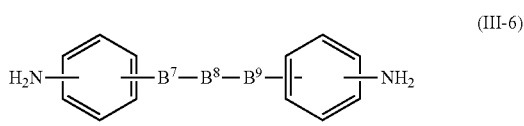
(III-6)

In the formula (III-6), $B^7$ and $B^9$ can be the same or different, and $B^7$ and $B^9$ respectively are divalent organic group; $B^8$ is a divalent nitrogen-containing cyclic group derived from pyridine, pyrimidine, triazine, piperidine, piperazine and the like.

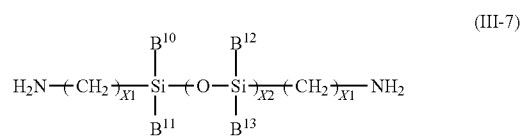
(III-7)

In the formula (III-7), $B^{10}$, $B^{11}$, $B^{12}$ and $B^{13}$ respectively can be the same or different, and $B^{10}$, $B^{11}$, $B^{12}$ and $B^{13}$ respectively are an alkyl group of 1 to 12 carbons. X1 is an integer of 1 to 3, and X2 is an integer of 1 to 20.

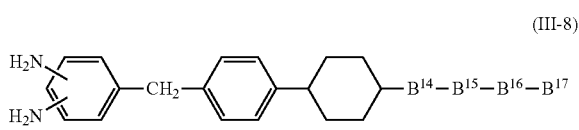
(III-8)

In the formula (III-8), $B^{14}$ is —O— or a cyclohexylene. $B^{15}$ is —CH$_2$—. $B^{16}$ is phenylene or cyclohexylene. $B^{17}$ is a hydrogen atom or a heptyl group.

Preferably, the diamine compound having a structure of formula (III-8) is selected from the group consisting of the diamine compound having a structure of formula (III-8-1) to (III-8-2):

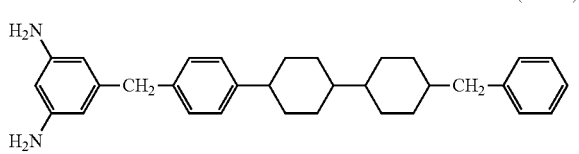
(III-8-1)

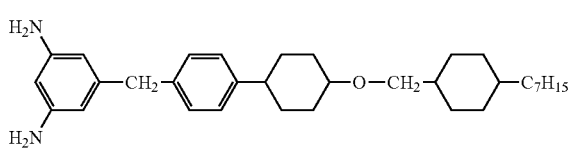
(III-8-2)

The other diamine compound having a structure of formula (III-9) to (III-30) are showed as follows:

(III-9)

(III-10)

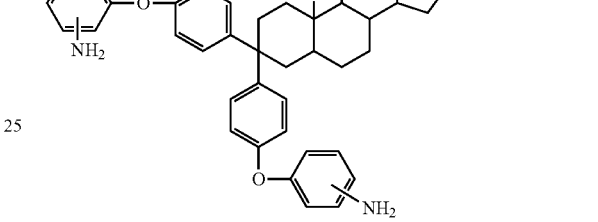
(III-11)

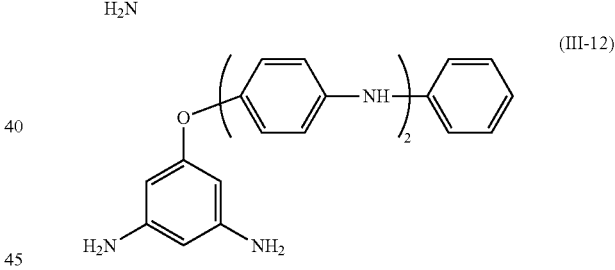
(III-12)

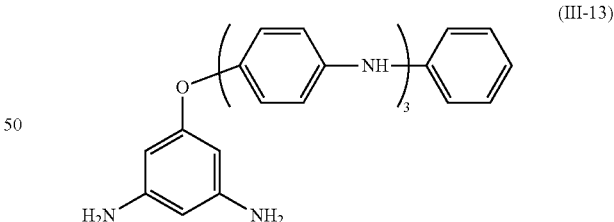
(III-13)

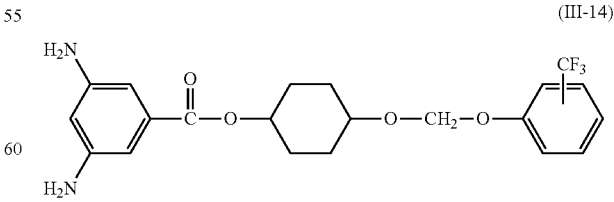
(III-14)

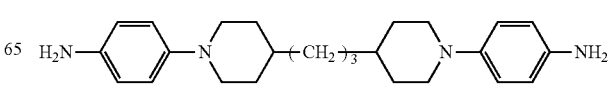
(III-15)

(III-16)
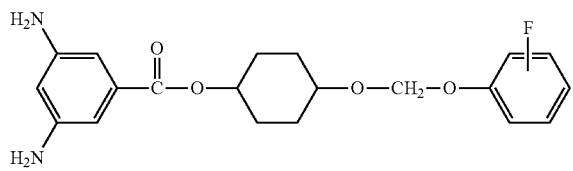
(III-17)
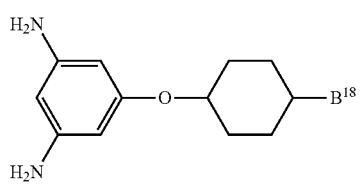
(III-18)
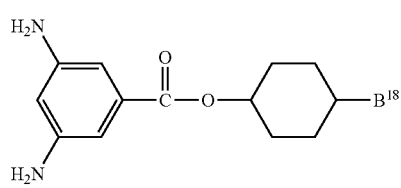
(III-19)
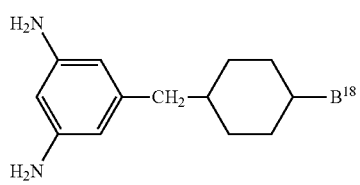
(III-20)
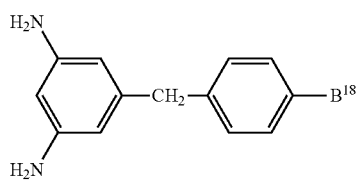
(III-21)
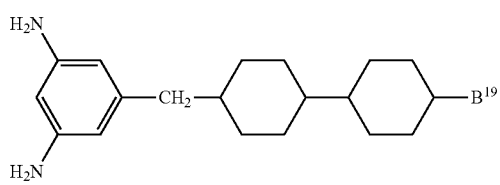
(III-22)
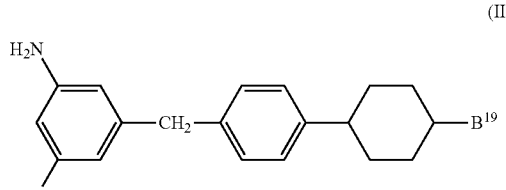
(III-23)
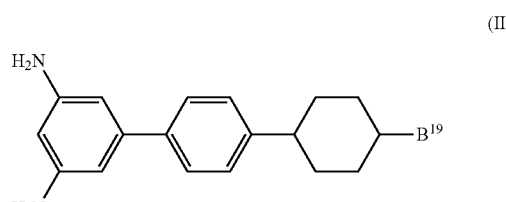
(III-24)
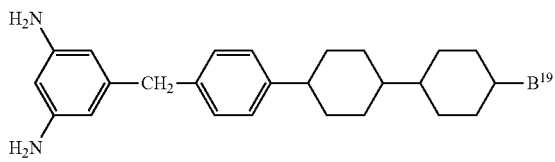
(III-25)
(III-26)
(III-27)
(III-28)
(III-29)
(III-30)
in the formula (III-17) to (III-25), $B^{18}$ preferably is an alkyl group of 1 to 10 carbons, or an alkoxyl group of 1 to 10 carbons. $B^{19}$ preferably is a hydrogen atom, an alkyl group of 1 to 10 carbons, or an alkoxyl group of 1 to 10 carbons.
The diamine compound having a structure of formula (III-31) is shown as follows:

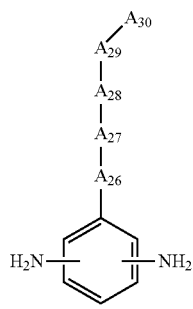

(III-31)

in the formula (III-31), $A_{26}$ is a single bond, a methylene group or an ethylene group. $A_{27}$ and $A_{29}$ can be the same or different, and $A_{27}$ and $A_{29}$ respectively are an ether group, a thioether group, a thioester group and an ester group. $A_{28}$ is an alkylene group of 1 to 10 carbons. $A_{30}$ is a monovalent organic functional group of steroid-containing group of 17 to 40 carbons.

Preferably, the diamine compound having a structure of formula (III-31) includes the diamine compound having a structure of formula (III-31-1) to (III-31-4):

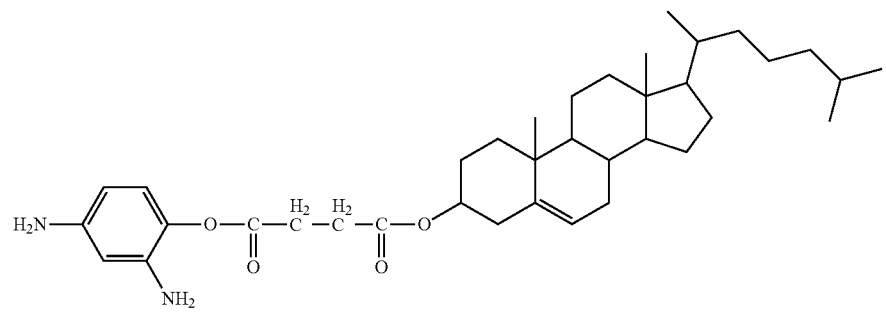

(III-31-1)

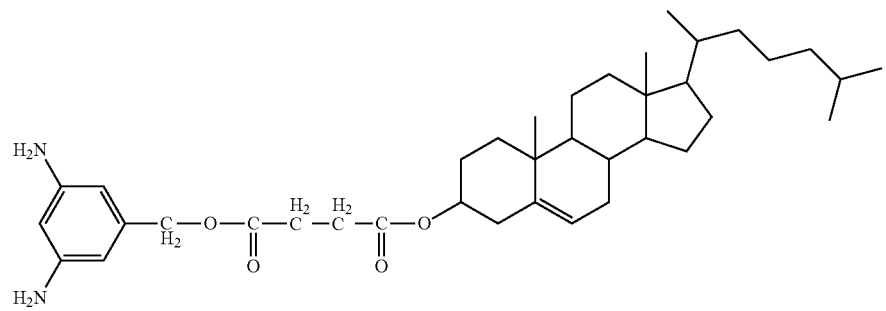

(III-31-2)

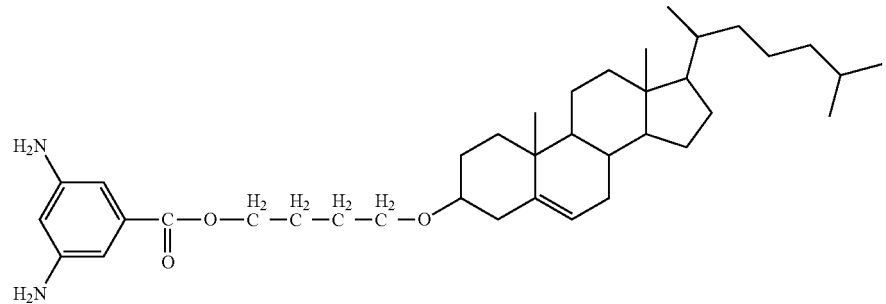

(III-31-3)

-continued

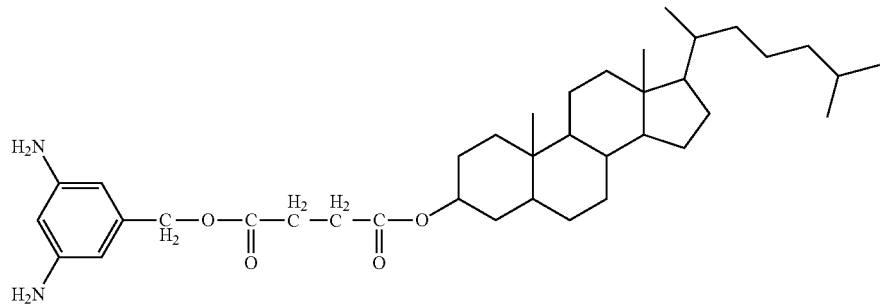

(III-31-4)

Preferably, the other diamine compound (b-3) includes but is not limited 1,2-diaminoethane, 4,4'-diaminodicyclohexylmethane, 4,4'-diaminodiphenylmethane, 4,4'-diaminodiphenylether, 5-[4-(4-n-amylcyclohexyl)cyclohexyl]phenylmethylene-1,3-diamino benzene, 1,1-bis[4-(4-aminophenoxy)phenyl]-4-(4-ethylphenyl)cyclohexane, 2,4-diaminophenyl ethyl formate, 1-octadecyloxy-2,4-diaminobenzene, the formula (III-1-1), the formula (III-1-2), the formula (III-2-1), the formula (III-2-11), the formula (III-8-1), the formula (III-26) to (III-30), the formula (III-31-1), p-diaminobenzene, m-diaminobenzene, or o-diaminobenzene.

Based on the diamine compound (b) as 100 moles, an amount of the aforementioned other diamine compound (b-3) is 0 moles to 87 moles, preferably is 7 moles to 81 moles, and more preferably is 15 moles to 75 moles.

When the polymer (A) in the liquid crystal alignment agent contains at least one of the diamine compounds (b-3) represented by formula (III-1), formula (III-2), and formula (III-26) to formula (III-30), the UV reliability of the liquid crystal display element can be further improved.

Method of Producing Polymer (A)

Method of Producing Polyamic Acid

A mixture is dissolved in a solvent, and the mixture includes a tetracarboxylic dianhydride compound (a) and a diamine compound (b). A polycondensation reaction is performed at 0° C. to 100° C. After 1 hr to 24 hrs, the aforementioned reacting solution is subjected to a reduced pressure distillation by an evaporator, or the aforementioned reacting solution was poured into a great quantity poor solvent to obtain a precipitate. Then, the precipitate is dried by a method of reduced pressure drying to produce polyamic acid.

Based on the diamine compound (b) as 100 moles, the amount of the tetracarboxylic dianhydride compound (a) preferably is 20 moles to 200 moles, and more preferably is 30 moles to 120 moles.

The solvent used in the polycondensation reaction can be the same as or different from the solvent in the liquid crystal alignment agent. The solvent used in the polycondensation reaction does not have any special limitations. The solvent needs to dissolve the reactant and the product. Preferably, the solvent includes but is not limited (1) aprotic solvent, such as N-methyl-2-pyrrolidinone (NMP), N,N-dimethylacetamide, N,N-dimethylformamide, dimethylsulfoxide, γ-butyrolactone, tetramethylurea, hexmethyl phosphoric acid tri-amino and the like; (2) phenolic solvent, such as m-cresol, xylenol, phenol, halogenated phenol and the like. Based on the mixture as 100 parts by weight, the amount of the solvent used in the polycondensation reaction preferably is 200 to 2000 parts by weight, and more preferably is 300 to 1800 parts by weight.

Particularly, in the polycondensation reaction, the solvent can combine with suitable poor solvent. The formed polyamic acid won't precipitate in the poor solvent. The poor solvent can be used alone or in combination of two or more, and the poor solvent includes but is not limited (1) alcohols, such as methanol, ethanol, isopropanol, cyclohexanol, ethylene glycol, propylene glycol, 1,4-butanediol, triethyleneglycol and the like; (2) ketone, such as acetone, methyl ethyl ketone, methyl isobutyl ketone, cyclohexanone and the like; (3) ester, such as methyl acetate, ethyl acetate, butyl acetate, diethyl oxalate, diethyl malonate, ethylene glycol monoethyl ether acetate and the like; (4) ether, such as diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, diethylene glycol dimethyl ether and the like; (5) halohydrocarbon, such as dichloromethane, 1,2-dichloro ethane, 1,4-dichloro butane, trichloroethane, chlorobenzene, m-dichlorobenzene and the like; (6) hydrocarbon, such as tetrahydrofuran, hexane, heptane, octane, benzene, toluene, xylene and the like, or a combination thereof. Based on the diamine compound (b) as 100 parts by weight, the amount of the poor solvent preferably is 0 to 60 parts by weight, and more preferably is 0 to 50 parts by weight.

Method of Producing Polyimide

A mixture is dissolved in a solvent, and a polymerization reaction is performed to form polyamic acid. The aforementioned mixture includes a tetracarboxylic dianhydride compound (a) and a diamine compound (b). Then, polyamic acid is heated to subject a dehydration ring-closure reaction in the presence of a dehydrating agent and a catalyst. The amic acid group of the polyamic acid is converted to an imide group by the dehydration ring-closure reaction, that is to say imidization, so as to form polyimide.

The solvent used in the dehydration ring-closure reaction can be the same as the solvent in the liquid crystal alignment agent and is not illustrated any more here. Based on polyamic acid as 100 parts by weight, the amount of the solvent used in the dehydration ring-closure reaction preferably is 200 to 2000 parts by weight, and more preferably is 300 to 1800 parts by weight.

The operating temperature of the dehydration ring-closure reaction preferably is 40° C. to 200° C. for getting a better imidization ratio of the polyamic acid. More preferably, the aforementioned temperature is 40° C. to 150° C. When the operating temperature of the dehydration ring-closure reaction is lower than 40° C., the reaction is incomplete, thereby lowering the imidization ratio of the polyamic acid. However, when the operating temperature is higher than 200° C., the weight-average molecular weight of the polyimide is lower.

The dehydrating agent used in the dehydration ring-closure reaction is selected from the group consisting of acid anhydride compound. For example, the acid anhydride compound is acetic anhydride, propionic anhydride, trifluoroacetic anhydride and the like. Based on the polyamic acid as 1 mole, the amount of the dehydrating agent is 0.01 mole to 20 moles. The catalyst used in the dehydration ring-closure reaction is selected from (1) pyridine compound, such as pyridine, trimethyl pyridine, dimethyl pyridine and the like; (2) tertiary amine compound, such as triethyl amine and the like. Based on the dehydrating agent as 1 mole, the amount of the catalyst is 0.5 mole to 10 moles.

Method of Producing Polyimide Series Block Copolymer

The polyimide series block-copolymer is selected from the group consisting of the polyamic acid block-copolymer, polyimide block-copolymer, polyamic acid-polyimide block copolymer and a combination thereof.

Preferably, a starting material is firstly dissolved in a solvent, and a polycondensation reaction is performed to produce the polyimide series block-copolymer. The starting material includes at least one aforementioned polyamic acid and/or at least one aforementioned polyimide, and the starting material further comprises a tetracarboxylic dianhydride compound (a) and a diamine compound (b).

The tetracarboxylic dianhydride compound (a) and the diamine compound (b) in the starting material are the same as the tetracarboxylic dianhydride compound (a) and the diamine compound (b) used in the method of producing aforementioned polyamic acid. The solvent used in the polycondensation reaction is the same as the solvent in the liquid crystal alignment agent and is not illustrated any more here.

Based on the starting material as 100 parts by weight, the solvent used in the polymerization reaction preferably is 200 to 2000 parts by weight, and more preferably is 300 to 1800 parts by weight. The operating temperature of the polymerization reaction preferably is 0° C. to 200° C., and more preferably is 0° C. to 100° C.

Preferably, the starting material includes but is not limited (1) two polyamic acid having different terminal groups and different structures; (2) two polyimide having different terminal groups and different structures; (3) the polyamic acid and the polyimide that have different terminal groups and different structures; (4) the polyamic acid, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyamic acid; (5) the polyimide, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyimide; (6) the polyamic acid, the polyimide, the tetracarboxylic dianhydride compound and the diamine compound, and the structure of the at least one of the tetracarboxylic dianhydride compound and the diamine compound is different from the structures of the tetracarboxylic dianhydride compound and the diamine compound that are used to form the polyamic acid or the polyimide; (7) two polyamic acid, tetracarboxylic dianhydride compounds or diamine compounds, and they have different structures; (8) two polyimide, tetracarboxylic dianhydride compounds or diamine compounds, and they have different structures; (9) two polyamic acid and a diamine compounds, and the two polyamic acid have different structures and the terminal groups of the polyamic acid are acetic anhydride groups; (10) two polyamic acid and a tetracarboxylic dianhydride compound, and the two polyamic acid have different structures and the terminal groups of the polyamic acid are amine groups; (11) two polyimide and a diamine compound, and the two polyimide have different structures and the terminal groups of the polyimide are acid anhydride groups; (12) two polyimide and a tetracarboxylic dianhydride compound, and the two polyimide have different structures and the terminal groups of the polyimide are amine groups.

Preferably, the polyamic acid, the polyimide and the polyimide block copolymer can be terminal-modified polymer after adjusting the molecular weight without departing from the efficiency of the present invention. The terminal-modified polymer can improve a coating ability of the liquid crystal alignment agent. When the polymerization reaction of the polyamic acid is performed, a compound having a monofunctional group is added to produce the terminal-modified polymer. The monofunctional group includes but is not limited (1) monoacid anhydride, such as maleic anhydride, phthalic anhydride, Itaconic anhydride, n-decyl succinic anhydride, n-dodecyl succinic anhydride, n-tetradecyl succinic anhydride, n-hexadecyl succinic anhydride and the like; (2) monoamine compound, such as aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine and the like; (3) monoisocyanate compound, such as phenyl isocyanate, naphthyl isocyanate and the like.

Solvent (B)

Preferably, the solvent (B) is N-methyl-2-pyrrolidone, γ-butyrolactone, γ-butyrolactam, 4-hydroxyl-4-methyl-2-pentanone, ethylene glycol monomethyl ether, butyl lactate, butyl acetate, methylmethoxypropionate, ethylethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, N,N-dimethylformamide, N,N-dimethylethanamide and the like. The solvent (B) can be used alone or in combination of two or more.

Based on a usage amount of 100 parts by weight of the polymer (A), the usage amount of the solvent (B) is 800 parts by weight to 4000 parts by weight, preferably 900 parts by weight to 3500 parts by weight, and more preferably 1000 parts by weight to 3000 parts by weight.

Additive (C)

The liquid crystal alignment agent can selectively include an additive (C) without departing from the efficiency of the present invention. The additive (C) is an epoxy compound or a functional group-containing silane compound. The additive (C) can raise the adhesion between the liquid crystal alignment film and the surface of the substrate. The additive (C) can be used alone or in combination of two or more.

The epoxy compound includes but is not limited ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, 2,2-dibromo-neopentyl diglycidyl ether, 1,3,5,6-tetraglycidyl-2,4-hexanediol, N,N,N',N'-tetraglycidyl-m-xylene diamine, 1,3-bis(N,N-diglycidylaminomethyl) cyclohexane, N,N,N',N'-tetraglycidyl-4,4'-diaminodiphenylmethane, N,N-glycidyl-p-glycidoxy aniline, 3-(N-allyl-N-glycidyl)aminopropyltrimethoxyl silane, 3-(N,N-diglycidyl)aminopropyl trimethoxyl silane and the like. The epoxy compound can be used alone or in combination of two or more.

Based on the polymer (A) as 100 parts by weight, the amount of the epoxy compound is less than 40 parts by weight, and preferably is 0.1 parts by weight to 30 parts by weight.

The functional group-containing silane compound includes but is not limited to 3-aminopropyl trimethoxy silane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylene triamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyl triethoxysilane, N-bis(oxyethylene)-3-aminopropyltrimethoxysilane, N-bis(oxyethylene)-3-aminopropyltriethoxysilane and the like. The functional group-containing silane compound can be used alone or in combination of two or more.

Based on the polymer (A) as 100 parts by weight, the amount of the silane-containing compound is less than 10 parts by weight, and preferably is 0.5 parts by weight to 10 parts by weight.

Based on the polymer (A) as 100 parts by weight, the amount of the additive (C) is 0.5 parts by weight to 50 parts by weight, and preferably is 1 part by weight to 45 parts by weight.

Producing Liquid Crystal Alignment Agent

The liquid crystal alignment agent of the present invention is produced by a conventional mixing method. For example, the tetracarboxylic dianhydride compound (a) and the diamine compound (b) are mixed uniformly to produce the polymer (A). Then, the polymer (A) is added to the solvent (B) at 0° C. to 200° C. in a mixer until all compositions are mixed uniformly, and the additive (C) is selectively added. Preferably, the solvent (B) is added into the polymer (A) at 20° C. to 60° C.

Preferably, at 25° C., a viscosity of the liquid crystal alignment agent is 15 cps to 35 cps, preferably is 17 cps to 33 cps, and more preferably is 20 cps to 30 cps.

Producing Liquid Crystal Alignment Film

The liquid crystal alignment agent of the invention is suitable for forming a liquid crystal alignment film through a photoalignment method.

The method of forming the liquid crystal alignment film can include, for instance, coating the liquid crystal alignment agent on a substrate to form a coating film, and irradiating the coating film with polarized or non-polarized radiation from a direction inclined relative to the coating film surface; or the coating film is irradiated with polarized radiation from a direction perpendicular to the coating film surface to provide liquid crystal alignment to the coating film.

First, the liquid crystal alignment agent of the invention is coated on one side of the transparent conductive film of the substrate on which a patterned transparent conductive film is disposed through a suitable coating method such as a roll coating method, a spin coating method, a printing method, or an ink-jet method. After coating, a pre-bake treatment is performed on the coating surface, and then a post-bake treatment is performed to form a coating film. The purpose of the pre-bake treatment is to volatilize the organic solvent in the pre-coating layer. The pre-bake treatment is, for instance, performed under the conditions of 0.1 minutes to 5 minutes at 40° C. to 120° C. The post-bake treatment is preferably performed under the condition of 120° C. to 300° C., more preferably 150° C. for 250° C., and is preferably performed for 5 minutes to 200 minutes, more preferably 10 minutes to 100 minutes. The film thickness of the coating film after post-bake is preferably 0.001 μm to 1 μm, more preferably 0.005 μm to 0.5 μm.

The substrate can include, for instance, a glass such as a float glass or a soda-lime glass; or a transparent substrate formed by, for instance, a plastic such as poly(ethylene terephthalate), poly(butylene terephthalate), polyethersulfone, or polycarbonate.

The transparent conductive film can include, for instance, a NESA film formed by $SnO_2$ or an ITO (indium tin oxide) film formed by $In_2O_3$—$SnO_2$. To form the transparent conductive film patterns, a method such as photo-etching or a method in which a mask is used when the transparent conductive film is formed can be used.

When the liquid crystal alignment agent is coated, to improve the adhesion between the substrate or transparent conductive film and the coating film, a functional silane compound or a titanate compound . . . etc. can be pre-coated on the substrate and the transparent conductive film.

Then, liquid crystal alignment is provided by irradiating the coating film with polarized or non-polarized radiation, and the liquid crystal alignment film is formed by the coating film. Here, the radiation can include, for instance, ultraviolet and visible light having a wavelength of 150 nm to 800 nm, and preferably includes ultraviolet having a wavelength of 300 nm to 400 nm. When the radiation used is polarized light (linearly polarized light or partially polarized light), irradiation can be performed from a direction perpendicular to the coating film surface. Moreover, to provide a pretilt angle, irradiation can also be performed from an inclined angle. Moreover, when non-polarized radiation is irradiated, irradiation needs to be performed from the direction inclined with respect to the coating film surface.

The light source of the radiation exposure can include, for instance, a low-pressure mercury lamp, a high-pressure mercury lamp, a deuterium lamp, a metal halide lamp, an argon resonance lamp, a xenon lamp, or an excimer laser. The ultraviolet in the preferred wavelength region can be obtained by, for instance, using the light sources above with, for instance, a filter or a diffraction grating.

The radiation exposure is preferably equal to or greater than 1 $J/m^2$ and less than 10000 $J/m^2$, more preferably 10 $J/m^2$ to 3000 $J/m^2$. Moreover, when liquid crystal alignment is provided to a coating film formed by a conventionally known liquid crystal alignment agent through a photoalignment method, a radiation exposure equal to or greater than 10000 $J/m^2$ is needed. However, if the liquid crystal alignment agent of the invention is used, then even if the radiation exposure in the photoalignment method is equal to or less than 3000 J/m², further equal to or less than 1000 J/m², and further equal to or less than 300 J/m², good photoalignment can still be provided. As a result, production cost of the liquid crystal display element can be reduced.

Producing Method of Liquid Crystal Display Element

The liquid crystal display element of the invention includes the liquid crystal alignment film formed by the liquid crystal alignment agent of the invention. The liquid crystal display element of the invention can be made according to the following method.

Two substrates on which a liquid crystal alignment film is formed are prepared, and liquid crystal is disposed between the two substrates to make a liquid crystal cell. To make the liquid crystal cell, the following two methods can be provided.

The first method includes first disposing the two substrates opposite to each other with a gap (cell gap) in between such that each liquid crystal alignment film is opposite to one another. Then, the peripheries of the two substrates are laminated together with a sealant. Next, liquid crystal is injected into the cell gap divided by the surfaces of the substrates and the sealant, and then the injection hole is sealed to obtain the liquid crystal cell.

The second method is called ODF (one drop fill, instillation). First, an ultraviolet curable sealing material for instance is coated on a predetermined portion on one of the two substrates on which a liquid crystal alignment film is formed. Then, liquid crystal is dropped onto the liquid crystal alignment film, and then the other substrate is laminated such that the liquid crystal alignment films are opposite to each other. Next, ultraviolet is irradiated on the entire surface of the substrate such that the sealant is cured. The liquid crystal cell can thus be made.

When any one of the above methods is used, preferably, after the liquid crystal cell is next heated to the temperature at which the liquid crystal used is in an isotropic phase, the liquid crystal cell is slowly cooled to room temperature to remove flow alignment when the liquid crystal is filled.

Next, by laminating a polarizer on the outer surface of the liquid crystal cell, the liquid crystal display element of the invention can be obtained. Here, when the liquid crystal alignment films are parallelly aligned, a liquid crystal display element having a TN-type or STN-type liquid crystal cell can be obtained by adjusting the angle formed by the polarization direction of the linear polarized radiation irradiated in the two substrates on which a liquid crystal alignment film is formed and the angle of each substrate and polarizing plate. Moreover, when the liquid crystal alignment films are perpendicularly aligned, by forming the liquid crystal cell, the directions of the easy-to-align axes of the two substrates on which a liquid crystal alignment film is formed are parallel, and then the polarizing plate and the liquid crystal cell are laminated together, such that the polarization direction thereof and the easy-to-align axes form a 45° angle. As a result, a liquid crystal display element having a vertical alignment-type liquid crystal cell can be formed.

The sealant for instance, an epoxy resin including a curing agent and an alumina ball as a spacer can be used.

Specific examples of the liquid crystal include, for instance, a nematic liquid crystal or a smectic liquid crystal.

When a TN-type or STN-type liquid crystal cell is used, the TN-type or STN-type liquid crystal cell preferably has a nematic liquid crystal having positive dielectric anisotropy, and examples thereof can include, for instance, a biphenyl-based liquid crystal, a phenyl cyclohexane-based liquid crystal, an ester-based liquid crystal, a terphenyl liquid crystal, a biphenyl cyclohexane-based liquid crystal, a pyrimidine-based liquid crystal, a dioxane-based liquid crystal, a bicyclooctane-based liquid crystal, or a cubane-based liquid crystal. Moreover, the following can further be added to the liquid crystal above: a cholesteric liquid crystal such as cholesteryl chloride, cholesteryl nonanoate, or cholesteryl carbonate . . . etc.; a chiral agent sold under the product name of, for instance, "C-15" or "CB-15" (made by Merck & Co.); or a ferroelectric liquid crystal such as p-decyloxybenzylidene-p-amino-2-methyl butyl cinnamate.

Moreover, when a vertical alignment-type liquid crystal cell is used, the vertical alignment-type liquid crystal cell preferably has a nematic liquid crystal having negative dielectric anisotropy, and examples thereof can include, for instance, a dicyanobenzene-based liquid crystal, a pyridazine-based liquid crystal, a Schiff base-based liquid crystal, an azoxy-based liquid crystal, a biphenyl-based liquid crystal, or a phenyl cyclohexane-based liquid crystal.

The polarizer used on the outside of the liquid crystal cell can include, for instance, a polarizer formed by a polarizing film known as "H film" obtained when iodine is absorbed at the same time that polyvinyl alcohol is stretch aligned by clamping with a cellulose acetate protective film, or a polarizer formed by the "H film" itself.

The liquid crystal display element of the invention thus made has excellent display performance, and even after prolonged use, the display performance is not worsened.

Reference is made to FIG. 1, which is a cross-sectional diagram of a liquid crystal display element according to the present invention. In a preferable example, the liquid crystal display element 100 includes a first unit 110, a second unit 120 and a liquid crystal unit 130. The second unit 120 is spaced apart opposite the first unit 110, and the liquid crystal unit 130 is disposed between the first unit 110 and the second unit 120.

The first unit 110 includes a first substrate 112, a first conductive film 114 and a first liquid crystal alignment film 116. The first conductive film 114 is disposed between the first substrate 112 and the first liquid crystal alignment film 116, and the first liquid crystal alignment film 116 is disposed on one side of the liquid crystal unit 130.

The second unit 120 includes a second substrate 122, a second conductive film 124 and a second liquid crystal alignment film 126. The second conductive film 124 is disposed between the second substrate 122 and the second liquid crystal alignment film 126, and the second liquid crystal alignment film 126 is disposed on the other side of the liquid crystal unit 130. In other words, the liquid crystal unit 130 is disposed between the first liquid crystal alignment film 116 and the second liquid crystal alignment film 126.

The first substrate 112 and the second substrate 122 are selected from a transparent material and the like. The transparent material includes but is not limited an alkali-free glass, a soda-lime glass, a hard glass (Pyrex glass), a quartz glass, polyethylene terephthalate, polybutylene terephthalate, polyethersulfone, polycarbonate and the like. The materials of the first conductive film 114 and the second conductive film 124 are selected from tin oxide ($SnO_2$), indium oxide-tin oxide ($In_2O_3$—$SnO_2$) and the like.

The first liquid crystal alignment film 116 and the second liquid crystal alignment film 126 respectively are the aforementioned liquid crystal alignment films, which can provide the liquid crystal unit 130 with a pretilt angle. Further, an electric field can be induced between the first conductive film 114 and the second conductive film 124 when a voltage is applied to the first conductive film 114 and the second conductive film 124. The electric field can drive the liquid crystal unit 130 and change the alignment of liquid crystal molecule in the liquid crystal unit 130.

Several embodiments are described below to illustrate the application of the present invention. However, these embodiments are not used for limiting the present invention. For those skilled in the art of the present invention, various variations and modifications can be made without departing from the spirit and scope of the present invention.

BRIEF DESCRIPTION OF THE DRAWINGS

The invention can be more fully understood by reading the following detailed description of the embodiment, with reference made to the accompanying drawings as follows:

FIG. 1 is a cross-sectional diagram of a liquid crystal display element according to the present invention.

DETAILED DESCRIPTION

Producing Diamine Compound Having a Structure of Formula (I)
Producing Polymer (A)
The Polymer (A) of Synthesis Examples A-1-1 to A-3-3 are described as follows.

SYNTHESIS EXAMPLE A-1-1

A 500 ml four-necked conical flask equipped with a nitrogen inlet, a stirrer, a condenser and a thermometer was purged with nitrogen. Then, 1.51 g (0.0025 mole) of the diamine compound (b-1-1) having a structure of formula (I-5, referring to as b-1-1), 7.47 g (0.015 mole) of the diamine compound (b-2-1) having a structure of formula (3-1-3, referring to as b-2-1), 6.44 g (0.0325 mole) of 4,4'-diaminodiphenylmethane (b-3-1) and 80 g of NMP were mixed uniformly at room temperature. Next, 1.25 g (0.005 mole) of tetracarboxylic dianhydride compound having a structure of formula (1-1) (a-1-1), 8.82 g (0.045 mole) of 1,2,3,4-cyclobutane tetracarboxylic dianhydride (a-2-1) and 20 g of NMP were added and left to react for 2 hours at room temperature. When the reaction is completed, the reacting solution was poured into 1500 ml of water to precipitate the polymer. The polymer obtained after filtering was repeatedly washed using methanol and filtered thrice, and then placed into a vacuum oven, where drying was carried out at 60° C., thereby obtaining a polymer (A-1-1).

SYNTHESIS EXAMPLES A-1-2 to A-1-10

Synthesis Examples A-1-2 to A-1-10 were practiced with the same method as in Synthesis Example A-1-1 by using various kinds or amounts of the components for the polymer. The formulations and detection results thereof were listed in Table 1 rather than focusing or mentioning them in details.

SYNTHESIS EXAMPLE A-2-1

A 500 ml four-necked conical flask equipped with a nitrogen inlet, a stirrer, a heater, a condenser and a thermometer was purged with nitrogen. Then, 1.51 g (0.0025 mole) of the diamine compound (b-1-1) having a structure of formula (I-5), 7.47 g (0.015 mole) of the diamine compound (b-2-1) having a structure of formula (3-1-3, referring to as b-2-1), 6.44 g (0.0325 mole) of 4,4'-diaminodiphenylmethane (b-3-1) and 80 g of NMP were mixed uniformly at room temperature. Next, 1.25 g (0.005 mole) of tetracarboxylic dianhydride compound having a structure of formula (I-1) (a-1-1), 8.82 g (0.045 mole) of 1,2,3,4-cyclobutane tetracarboxylic dianhydride (a-2-1) and 20 g of NMP were added and left to react for 6 hours at room temperature. And then, 97 g of NMP, 2.55 g of acetic anhydride and 19.75 g of pyridine were added at 60° C. and left to stir for 2 hours for imidization reaction. When the reaction is completed, the reacting solution was poured into 1500 ml of water to precipitate the polymer. The polymer obtained after filtering was repeatedly washed using methanol and filtered thrice, and then placed into a vacuum oven, where drying was carried out at 60° C., thereby obtaining a polymer (A-2-1).

SYNTHESIS EXAMPLES A-2-2 to A-2-5

Synthesis Examples A-2-2 to A-2-5 were practiced with the same method as in Synthesis Example A-2-1 by using various kinds or amounts of the compositions for the polyimide. The formulations and detection results thereof were listed in Table 1 rather than focusing or mentioning them in details.

COMPARATIVE SYNTHESIS EXAMPLES A-3-1 to A-3-7

Synthesis Examples A-3-1 to A-3-7 were practiced with the same method as in Synthesis Example A-1-1 by using various kinds or amounts of the compositions for the polyimide. The formulations and detection results thereof were listed in Table 2 rather than focusing or mentioning them in details.

COMPARATIVE SYNTHESIS EXAMPLES A-3-8 to A-3-12

Synthesis Examples A-3-8 to A-3-12 were practiced with the same method as in Synthesis Example A-2-1 by using various kinds or amounts of the compositions for the polyimide. The formulations and detection results thereof were listed in Table 2 rather than focusing or mentioning them in details.

Examples and Comparative Examples of Liquid Crystal Alignment Agent, Liquid Crystal Alignment Film and Liquid Crystal Display Element Example 1 to example 15 and comparative example 1 to comparative example 12 of the liquid crystal alignment agent, the liquid crystal alignment film, and the liquid crystal display element are described below:

a. Liquid Crystal Alignment Agent 100 parts by weight of the polymer (A-1-1) was added into 1200 parts by weight of N-methyl-2-pyrrolidinone (hereinafter abbreviated as B-1) and 600 parts by weight of ethylene glycol n-butyl ether (hereinafter abbreviated as B-2) for mixing in a mixer until all compounds were mixed uniformly at room temperature, thereby obtaining the liquid crystal alignment agent of Example 1.

b. Liquid Crystal Alignment Film and Liquid Crystal Display Element

The liquid crystal alignment agent was coated on a glass substrate having a layer of conductive film formed by ITO with a spin coating method. Then, pre-bake was performed on a heating plate at a temperature of 100° C. for 5 minutes, and post-bake was performed in a circulation oven at a temperature 220° C. for 30 minutes, thereby obtaining a coating film.

A Hg—Xe lamp and a Glan-Taylor prism were used to irradiate the surface of the coating film with polarized ultraviolet containing a 313 nm bright line for 50 seconds from a direction inclined 45° from the normal of the substrate, thereby providing energy for liquid crystal alignment. A liquid crystal alignment film is thus fabricated. Here, the illumination of the irradiated surface under a wavelength of 313 nm is 2 mW/cm². The same operation was performed to fabricate 2 (1 pair) substrates having a coating film (liquid crystal alignment film) on which a polarized ultraviolet irradiation treatment was performed.

Next, an epoxy resin sealant containing an alumina ball having a diameter of 5.5 µm was coated on the periphery of the surface of the pair of substrates on which a liquid crystal alignment film was formed with screen printing, and then the substrates were laminated in a manner that the liquid crystal alignment film of each substrate was opposite to each other, and the irradiation direction of the polarized ultraviolet was antiparallel, and then a pressure of 10 kg was applied with a hot press to perform hot press lamination at 150° C.

Next, liquid crystal was injected from the liquid crystal injection hole, and an epoxy resin-based sealant was used to seal the liquid crystal injection hole. To remove the flow alignment when liquid crystal is injected, the liquid crystal is heated to 150° C. and then slowly cooled to room temperature. Lastly, the polarizers were laminated on two sides on the outside of the substrate in a manner that the polarization directions of the polarizers are perpendicular to each other and form 45° with the polarization direction of the ultraviolet of the liquid crystal alignment film, thereby obtaining the liquid crystal display element of example 1.

The resulted liquid crystal display element was evaluated according to the following evaluation methods, and the result thereof was listed as Table 3.

EXAMPLES 2 to 15

Examples 2 to 15 were practiced with the same method as in Example 1 by using various kinds or amounts of the compositions for the liquid crystal alignment agent. The formulations and detection results thereof were listed in Table 3 rather than focusing or mentioning them in details.

COMPARATIVE EXAMPLES 1 to 12

Comparative Examples 1 to 12 were practiced with the same method as in Example 1 by using various kinds or amounts of the compositions for the liquid crystal alignment agent. The formulations and detection results thereof were listed in Table 4 rather than focusing or mentioning them in details.

Evaluation Methods
Ultraviolet Reliability

The ultraviolet reliability of the liquid crystal alignment film was evaluated by the voltage holding ratio of the liquid crystal display element. More specifically, the measuring method of the voltage holding ratio of the liquid crystal display element is as described below.

The voltage holding ratio of the liquid crystal display element of each example and comparative example was respectively measured with an electrical measuring machine (made by Toyo Corporation, Model 6254). The test conditions include the application of a voltage of 4 V for 2 ms, release of the voltage, and measurement of the voltage holding ratio (calculated as VHR1) 1667 ms from release. Then, after the liquid crystal display element was irradiated with 4200 mJ/cm² of ultraviolet (model of ultraviolet irradiation machine: KN-SH48K1, made by Kuang Neng), the voltage holding ratio (calculated as VHR2) after ultraviolet irradiation was measured with the same test conditions. Lastly, percentage change of voltage holding ratio (calculated as $VHR^{UV}$ (%)) was obtained by calculating with equation (VI). A lower percentage change of voltage holding ratio indicates better ultraviolet reliability.

$$VHR^{UV}(\%) = \frac{VHR1 - VHR2}{VHR1} \times 100\% \qquad (VI)$$

◎: $VHR^{UV} < 5\%$

○: $5\% \leq VHR^{UV} < 10\%$

△: $10\% \leq VHR^{UV} < 20\%$

✕: $20\% \leq VHR^{UV}$

It can be known from Table 3 and Table 4 that, in comparison to the liquid crystal alignment films (example 1 to example 15) formed by all of the tetracarboxylic dianhydride compound (a-1) and the diamine compounds (b-1) and (b-2), the UV reliability of the liquid crystal alignment films (comparative examples 1, 4-8, and 11-12) formed by the polymer (A) without the dianhydride compound (a-1) is poor; the UV reliability of the liquid crystal alignment films (comparative examples 2, 4, 6, 7, 9, and 11-12) formed by the polymer (A) without the diamine compound (b-1) is poor; and the UV reliability of the liquid crystal alignment films (comparative examples 3, 5-7, and 10-12) formed by the polymer (A) without the diamine compound (b-2) is poor.

Moreover, when the polymer (A) in the liquid crystal alignment agent contains the diamine compound (b-3) represented by formula (II-1), formula (II-2), and formula (II-26) to formula (II-30), the ultraviolet reliability of the formed liquid crystal alignment films (examples 3, 6, 8, 10, 13, and 14) is particularly good.

Based on the above, since the polymer in the liquid crystal alignment agent of the invention is formed by a tetracarboxylic dianhydride component containing a tetracarboxylic dianhydride compound having a specific structure and a diamine component containing a diamine compound having a specific structure, when the liquid crystal alignment agent is applied in a liquid crystal alignment film, the liquid crystal alignment film has better ultraviolet reliability. Therefore, the liquid crystal alignment agent is suitable for a liquid crystal display device.

It should be supplemented that, although specific compounds, components, specific reactive conditions, specific processes, specific evaluation methods or specific equipments are employed as exemplary embodiments of the present invention, for illustrating the liquid crystal alignment agent, the liquid crystal alignment film and the liquid crystal display element having thereof of the present invention. However, as is understood by a person skilled in the art instead of limiting to the aforementioned examples, the liquid crystal alignment agent, the liquid crystal alignment film and the liquid crystal display element having thereof of the present invention also can be manufactured by using other compounds, components, reactive conditions, processes, analysis methods and equipment without departing from the spirit and scope of the present invention.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

TABLE 1

| Compositions (mole %) | | | Synthesis Example | | | | | | | | | |
|---|---|---|---|---|---|---|---|---|---|---|---|---|
| | | | A-1-1 | A-1-2 | A-1-3 | A-1-4 | A-1-5 | A-1-6 | A-1-7 | A-1-8 | A-1-9 | A-1-10 |
| Tetracarboxylic Dianhydride Compound (a) | Tetracarboxylic Dianhydride Compound (a-1) | a-1-1 | 10 | — | — | — | — | — | 30 | — | — | 5 |
| | | a-1-2 | — | 15 | — | 25 | 30 | — | 5 | 45 | 22 | — |
| | | a-1-3 | — | — | 20 | — | — | 40 | — | — | 30 | — |
| | Tetracarboxylic Dianhydride Compound (a-2) | a-2-1 | 90 | — | — | 75 | — | — | 65 | 50 | — | 80 |
| | | a-2-2 | — | 85 | — | — | 70 | 30 | — | 5 | — | — |
| | | a-2-3 | — | — | 80 | — | — | 30 | — | — | 50 | 15 |
| Diamine Compound (b) | Diamine Compound (b-1) | b-1-1 | 5 | — | — | — | — | — | — | — | — | — |
| | | b-1-2 | — | 10 | — | — | — | — | — | 17 | 8 | — |
| | | b-1-3 | — | — | 20 | — | — | — | 3 | — | 10 | — |
| | | b-1-4 | — | — | — | 15 | 10 | — | — | — | — | 15 |
| | | b-1-5 | — | — | — | — | 10 | — | — | — | — | — |
| | | b-1-6 | — | — | — | — | — | 12 | — | — | — | — |
| | Diamine Compound (b-2) | b-2-1 | 30 | — | — | — | 10 | — | 2 | — | 60 | — |
| | | b-2-2 | — | 20 | — | — | — | 50 | — | — | — | 10 |
| | | b-2-3 | — | — | 40 | 20 | — | — | 10 | 80 | — | — |
| | | b-2-4 | — | — | — | 5 | — | — | — | — | — | 60 |
| | Other Diamine Compound (b-3) | b-3-1 | 65 | — | 35 | — | 60 | — | 85 | — | — | — |
| | | b-3-2 | — | 70 | — | 60 | — | 25 | — | — | 20 | — |
| | | b-3-3 | — | — | 5 | — | — | — | — | 2 | — | 15 |
| | | b-3-4 | — | — | — | — | — | 15 | — | 1 | — | — |
| | | b-3-5 | — | — | — | — | 10 | — | — | — | — | — |
| | | b-3-6 | — | — | — | — | — | — | — | — | 2 | — |
| | | b-3-7 | — | — | — | — | — | — | — | — | — | — |

| Compositions (mole %) | | | Synthesis Example | | | | |
|---|---|---|---|---|---|---|---|
| | | | A-2-1 | A-2-2 | A-2-3 | A-2-4 | A-2-5 |
| Tetracarboxylic Dianhydride Compound (a) | Tetracarboxylic Dianhydride Compound (a-1) | a-1-1 | 10 | — | — | — | — |
| | | a-1-2 | — | 15 | — | — | 22 |
| | | a-1-3 | — | — | 20 | 40 | 30 |
| | Tetracarboxylic Dianhydride Compound (a-2) | a-2-1 | 90 | — | — | — | — |
| | | a-2-2 | — | 85 | — | 30 | — |
| | | a-2-3 | — | — | 80 | 30 | 50 |
| Diamine Compound (b) | Diamine Compound (b-1) | b-1-1 | 5 | — | — | — | — |
| | | b-1-2 | — | 10 | — | — | 8 |
| | | b-1-3 | — | — | 20 | — | 10 |
| | | b-1-4 | — | — | — | — | — |
| | | b-1-5 | — | — | — | — | — |
| | | b-1-6 | — | — | — | 12 | — |
| | Diamine Compound (b-2) | b-2-1 | 30 | — | — | — | 60 |
| | | b-2-2 | — | 20 | — | 50 | — |
| | | b-2-3 | — | — | 40 | — | — |
| | | b-2-4 | — | — | — | — | — |
| | Other Diamine Compound (b-3) | b-3-1 | 65 | — | 35 | — | — |
| | | b-3-2 | — | 70 | — | 25 | 20 |
| | | b-3-3 | — | — | 5 | — | — |
| | | b-3-4 | — | — | — | 15 | — |
| | | b-3-5 | — | — | — | — | — |
| | | b-3-6 | — | — | — | — | 2 |
| | | b-3-7 | — | — | — | — | — |

TABLE 2

| Compositions (mole %) | | | Comparative Synthesis Example | | | | | | | | | | | |
|---|---|---|---|---|---|---|---|---|---|---|---|---|---|---|
| | | | A-3-1 | A-3-2 | A-3-3 | A-3-4 | A-3-5 | A-3-6 | A-3-7 | A-3-8 | A-3-9 | A-3-10 | A-3-11 | A-3-12 |
| Tetracarboxylic Dianhydride Compound (a) | Tetracarboxylic Dianhydride Compound (a-1) | a-1-1 | — | — | — | — | — | — | — | — | — | — | — | — |
| | | a-1-2 | — | 15 | — | — | — | — | — | — | 15 | — | — | — |
| | | a-1-3 | — | — | 20 | — | — | — | — | — | — | 20 | — | — |
| | Tetracarboxylic Dianhydride Compound (a-2) | a-2-1 | 90 | — | — | 75 | — | 100 | — | 90 | — | — | 100 | — |
| | | a-2-2 | 10 | 85 | — | 25 | 100 | — | 100 | 10 | 85 | — | — | 100 |
| | | a-2-3 | — | — | 80 | — | — | — | — | — | — | 80 | — | — |

TABLE 2-continued

| Compositions (mole %) | | | Comparative Synthesis Example | | | | | | | | | | | |
|---|---|---|---|---|---|---|---|---|---|---|---|---|---|---|
| | | | A-3-1 | A-3-2 | A-3-3 | A-3-4 | A-3-5 | A-3-6 | A-3-7 | A-3-8 | A-3-9 | A-3-10 | A-3-11 | A-3-12 |
| Diamine Compound (b) | Diamine Compound (b-1) | b-1-1 | 5 | — | — | — | — | — | — | 5 | — | — | — | — |
| | | b-1-2 | — | — | — | — | — | — | — | — | — | — | — | — |
| | | b-1-3 | — | — | 20 | — | — | — | — | — | — | 20 | — | — |
| | | b-1-4 | — | — | — | — | 10 | — | — | — | — | — | — | — |
| | | b-1-5 | — | — | — | — | 10 | — | — | — | — | — | — | — |
| | | b-1-6 | — | — | — | — | — | — | — | — | — | — | — | — |
| | Diamine Compound (b-2) | b-2-1 | 30 | — | — | — | — | — | — | 30 | — | — | — | — |
| | | b-2-2 | — | 20 | — | — | — | — | — | — | 20 | — | — | — |
| | | b-2-3 | — | — | — | 20 | — | — | — | — | — | — | — | — |
| | | b-2-4 | — | — | — | 5 | — | — | — | — | — | — | — | — |
| | Other Diamine Compound (b-3) | b-3-1 | 65 | 10 | 75 | 15 | 60 | 70 | — | 65 | 10 | 75 | 70 | — |
| | | b-3-2 | — | 70 | — | 60 | 10 | — | 80 | — | 70 | — | — | 60 |
| | | b-3-3 | — | — | 5 | — | — | — | — | — | — | 5 | — | — |
| | | b-3-4 | — | — | — | — | — | — | — | — | — | — | — | — |
| | | b-3-5 | — | — | — | — | 10 | 30 | — | — | — | — | 30 | — |
| | | b-3-6 | — | — | — | — | — | — | 20 | — | — | — | — | 20 |
| | | b-3-7 | — | — | — | — | — | — | — | — | — | — | — | 20 | a-1-1 tetracarboxylic dianhydride compound having a structure of formula (1-1)
a-1-2 tetracarboxylic dianhydride compound having a structure of formula (1-2)
a-1-3 tetracarboxylic dianhydride compound having a structure of formula (1-5)
a-2-1 1,2,3,4-cyclobutane tetracarboxylic dianhydride
a-2-2 pyromellitic dianhydride
a-2-3 2,3,5-tricarboxycyclopentylacetic acid dianhydride
b-1-1 diamine compound having a structure of formula (I-5)
b-1-2 diamine compound having a structure of formula (I-6)
b-1-3 diamine compound having a structure of formula (I-16)
b-1-4 diamine compound having a structure of formula (I-13)
b-1-5 diamine compound having a structure of formula (I-15)
b-1-6 diamine compound having a structure of formula (I-1)
b-2-1 diamine compound having a structure of formula (3-1-3)
b-2-2 diamine compound having a structure of formula (3-1-6)
b-2-3 diamine compound having a structure of formula (3-2-1)
b-2-4 diamine compound having a structure of formula (3-1-7)
b-3-1 4,4'-diaminodiphenylmethane
b-3-2 4,4'-diaminodiphenyl ether
b-3-3 diamine compound having a structure of formula (III-1-4)
b-3-4 diamine compound having a structure of formula (III-29)
b-3-5 3,3'-diamino-chalcone
b-3-6 4,4'-diamino-stilbene
b-3-7 diamine compound having a structure of formula (III-31-4)

TABLE 3

| Compositions (Parts by Weight) | | Example | | | | | | | |
|---|---|---|---|---|---|---|---|---|---|
| | | 1 | 2 | 3 | 4 | 5 | 6 | 7 | 8 |
| Polymer (A) | A-1-1 | 100 | — | — | — | — | — | — | — |
| | A-1-2 | — | 100 | — | — | — | — | — | — |
| | A-1-3 | — | — | 100 | — | — | — | — | — |
| | A-1-4 | — | — | — | 100 | — | — | — | — |
| | A-1-5 | — | — | — | — | 100 | — | — | — |
| | A-1-6 | — | — | — | — | — | 50 | — | — |
| | A-1-7 | — | — | — | — | — | — | 100 | — |
| | A-1-8 | — | — | — | — | — | — | — | 100 |
| | A-1-9 | — | — | — | — | — | — | — | — |
| | A-1-10 | — | — | — | — | — | — | — | — |
| | A-2-1 | — | — | — | — | — | — | — | — |
| | A-2-2 | — | — | — | — | — | 50 | — | — |
| | A-2-3 | — | — | — | — | — | — | — | — |
| | A-2-4 | — | — | — | — | — | — | — | — |
| | A-2-5 | — | — | — | — | — | — | — | — |
| | A-3-1 | — | — | — | — | — | — | — | — |
| | A-3-2 | — | — | — | — | — | — | — | — |
| | A-3-3 | — | — | — | — | — | — | — | — |
| | A-3-4 | — | — | — | — | — | — | — | — |
| | A-3-5 | — | — | — | — | — | — | — | — |
| | A-3-6 | — | — | — | — | — | — | — | — |
| | A-3-7 | — | — | — | — | — | — | — | — |

TABLE 3-continued

| | | 1 | 2 | 3 | 4 | 5 | 6 | 7 | 8 |
|---|---|---|---|---|---|---|---|---|---|
| | A-3-8 | — | — | — | — | — | — | — | — |
| | A-3-9 | — | — | — | — | — | — | — | — |
| | A-3-10 | — | — | — | — | — | — | — | — |
| | A-3-11 | — | — | — | — | — | — | — | — |
| | A-3-12 | — | — | — | — | — | — | — | — |
| Solvent (B) | B-1 | 1200 | — | 800 | 800 | 800 | — | — | 1000 |
| | B-2 | 600 | 1600 | — | — | — | 800 | 1500 | — |
| | B-3 | — | — | 1000 | 1000 | 1000 | 800 | 100 | 600 |
| Additive (C) | C-1 | — | 5 | — | — | — | — | — | — |
| | C-2 | — | — | — | — | — | — | — | — |
| Ultraviolet reliability | | ○ | ○ | ◉ | ○ | ○ | ◉ | ○ | ◉ |

| Compositions | | Example | | | | | | |
|---|---|---|---|---|---|---|---|---|
| (Parts by Weight) | | 9 | 10 | 11 | 12 | 13 | 14 | 15 |
| Polymer (A) | A-1-1 | — | — | — | — | — | — | 50 |
| | A-1-2 | — | — | — | — | — | — | — |
| | A-1-3 | — | — | — | — | — | — | — |
| | A-1-4 | — | — | — | — | — | — | — |
| | A-1-5 | — | — | — | — | — | — | — |
| | A-1-6 | — | — | — | — | — | — | — |
| | A-1-7 | — | — | — | — | — | — | — |
| | A-1-8 | — | — | — | — | — | — | — |
| | A-1-9 | 100 | — | — | — | — | — | — |
| | A-1-10 | — | 100 | — | — | — | — | — |
| | A-2-1 | — | — | 100 | — | — | — | — |
| | A-2-2 | — | — | — | 100 | — | — | — |
| | A-2-3 | — | — | — | — | 100 | — | — |
| | A-2-4 | — | — | — | — | — | 100 | — |
| | A-2-5 | — | — | — | — | — | — | 50 |
| | A-3-1 | — | — | — | — | — | — | — |
| | A-3-2 | — | — | — | — | — | — | — |
| | A-3-3 | — | — | — | — | — | — | — |
| | A-3-4 | — | — | — | — | — | — | — |
| | A-3-5 | — | — | — | — | — | — | — |
| | A-3-6 | — | — | — | — | — | — | — |
| | A-3-7 | — | — | — | — | — | — | — |
| | A-3-8 | — | — | — | — | — | — | — |
| | A-3-9 | — | — | — | — | — | — | — |
| | A-3-10 | — | — | — | — | — | — | — |
| | A-3-11 | — | — | — | — | — | — | — |
| | A-3-12 | — | — | — | — | — | — | — |
| Solvent (B) | B-1 | 900 | 850 | 1400 | — | — | 1200 | 800 |
| | B-2 | 300 | 850 | — | 1000 | — | 600 | — |
| | B-3 | 300 | — | — | 350 | 1500 | — | 1000 |
| Additive (C) | C-1 | — | — | 3 | — | — | — | — |
| | C-2 | 4 | — | 1 | — | — | — | — |
| Ultraviolet reliability | | ○ | ◉ | ○ | ○ | ◉ | ◉ | ○ |

TABLE 4

| Compositions | | Example | | | | | | | | | | | |
|---|---|---|---|---|---|---|---|---|---|---|---|---|---|
| (Parts by Weight) | | 1 | 2 | 3 | 4 | 5 | 6 | 7 | 8 | 9 | 10 | 11 | 12 |
| Polymer (A) | A-1-1 | — | — | — | — | — | — | — | — | — | — | — | — |
| | A-1-2 | — | — | — | — | — | — | — | — | — | — | — | — |
| | A-1-3 | — | — | — | — | — | — | — | — | — | — | — | — |
| | A-1-4 | — | — | — | — | — | — | — | — | — | — | — | — |
| | A-1-5 | — | — | — | — | — | — | — | — | — | — | — | — |
| | A-1-6 | — | — | — | — | — | — | — | — | — | — | — | — |
| | A-1-7 | — | — | — | — | — | — | — | — | — | — | — | — |
| | A-1-8 | — | — | — | — | — | — | — | — | — | — | — | — |
| | A-1-9 | — | — | — | — | — | — | — | — | — | — | — | — |
| | A-1-10 | — | — | — | — | — | — | — | — | — | — | — | — |
| | A-2-1 | — | — | — | — | — | — | — | — | — | — | — | — |
| | A-2-2 | — | — | — | — | — | — | — | — | — | — | — | — |

TABLE 4-continued

| Compositions (Parts by Weight) | | 1 | 2 | 3 | 4 | 5 | 6 | 7 | 8 | 9 | 10 | 11 | 12 |
|---|---|---|---|---|---|---|---|---|---|---|---|---|---|
| | A-2-3 | — | — | — | — | — | — | — | — | — | — | — | — |
| | A-2-4 | — | — | — | — | — | — | — | — | — | — | — | — |
| | A-2-5 | — | — | — | — | — | — | — | — | — | — | — | — |
| | A-3-1 | 100 | — | — | — | — | — | — | — | — | — | — | — |
| | A-3-2 | — | 100 | — | — | — | — | — | — | — | — | — | — |
| | A-3-3 | — | — | 100 | — | — | — | — | — | — | — | — | — |
| | A-3-4 | — | — | — | 100 | — | — | — | — | — | — | — | — |
| | A-3-5 | — | — | — | — | 100 | — | — | — | — | — | — | — |
| | A-3-6 | — | — | — | — | — | 100 | — | — | — | — | — | — |
| | A-3-7 | — | — | — | — | — | — | 100 | — | — | — | — | — |
| | A-3-8 | — | — | — | — | — | — | — | 100 | — | — | — | — |
| | A-3-9 | — | — | — | — | — | — | — | — | 100 | — | — | — |
| | A-3-10 | — | — | — | — | — | — | — | — | — | 100 | — | — |
| | A-3-11 | — | — | — | — | — | — | — | — | — | — | 100 | — |
| | A-3-12 | — | — | — | — | — | — | — | — | — | — | — | 100 |
| Solvent (B) | B-1 | 1200 | — | 800 | 800 | 800 | — | — | 1000 | 900 | 850 | 1200 | 800 |
| | B-2 | 600 | 1600 | — | — | — | 800 | 1500 | — | 300 | 850 | 600 | — |
| | B-3 | — | — | 1000 | 1000 | 1000 | 800 | 100 | 600 | 300 | — | — | 1000 |
| Additive (C) | C-1 | — | 5 | — | — | — | — | — | — | — | — | — | — |
| | C-2 | — | — | — | — | — | — | — | — | 4 | — | — | — |
| Ultraviolet reliability | | X | X | X | X | X | X | X | X | X | X | X | X |

B-1 N-methyl-2-pyrrolidinone
B-2 ethylene glycol n-butyl ether
B-3 N,N-dimethylacetamide
C-1 N,N,N',N'-tetraglycidyl-4,4'-diaminodiphenylmethane
C-2 1,3-bis(N,N-diglycidyl aminomethyl)cyclohexane

What is claimed is:

1. A liquid crystal alignment agent, comprising:
   a polymer (A), synthesized by reacting a mixture that includes a tetracarboxylic dianhydride compound (a) and a diamine compound (b); and
   a solvent (B); and
   wherein the tetracarboxylic dianhydride compound (a) includes a tetracarboxylic dianhydride compound (a-1) having a structure of formula (1), and the diamine compound (b) includes a diamine compound (b-1) having a structure of formula (2), and a diamine compound (b-2) having a structure of formula (3):

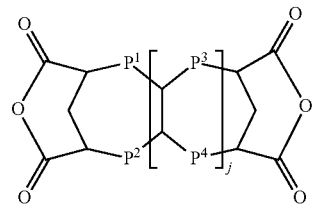

(1)

in the formula (1), $P^1$, $P^2$, $P^3$ and $P^4$ respectively are a single bond or a methylene group; j is an integer of 1 to 3;

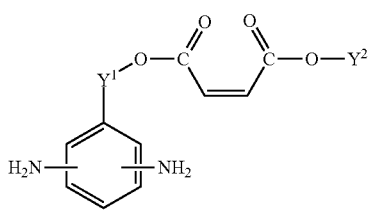

(2)

in the formula (2), $Y^1$ is an alkylene group of 1 to 12 carbons; $Y^2$ is a steroid-containing group or a structure of formula (2-1):

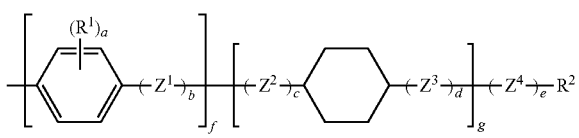

(2-1)

in the formula (2-1), $R^1$ is a hydrogen atom, a fluoro atom or a methyl group; $R^2$ is a hydrogen atom, a fluoro atom, an alkyl group of 1 to 12 carbons, a fluoroalkyl group of 1 to 12 carbons, an alkoxyl group of 1 to 12 carbons, $-OCH_2F$, $-OCHF_2$ or $-OCF_3$; $Z^1$, $Z^2$ and $Z^3$ respectively are a single bond,

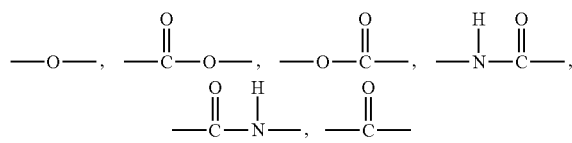

or an alkylene group of 1 to 3 carbons; $Z^4$ is

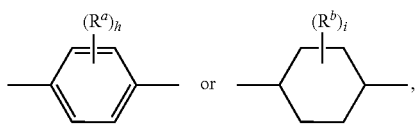

wherein $R^a$ and $R^b$ respectively are a hydrogen atom, a fluoro atom or a methyl group; h and i respectively are 0, 1 or 2; a is 0, 1 or 2; b, c and d respectively are an integer of 0 to 4; e, f and g respectively are an integer of 0 to 3, and e+f+g≥1,

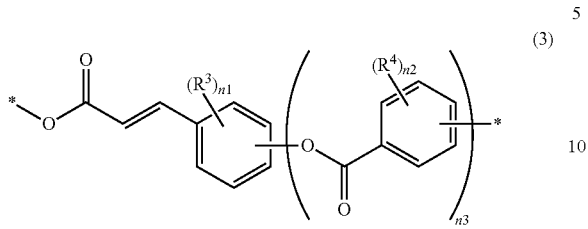

(3)

in formula (3), $R^3$ and $R^4$ each independently represent a $C_1$ to $C_6$ alkyl group, a $C_1$ to $C_6$ alkoxy group, a halogen atom, or a cyano group; n1 and n2 each independently represent an integer of 0 to 4; n3 represents an integer of 0 or 1; and * each independently represents a bonding position, and a diamine moiety is bonded to one of the *.

2. The liquid crystal alignment agent of claim 1, wherein the diamine compound (b-2) has at least one selected from the group consisting of a structure represented by formula (3-1) and a structure represented by formula (3-2);

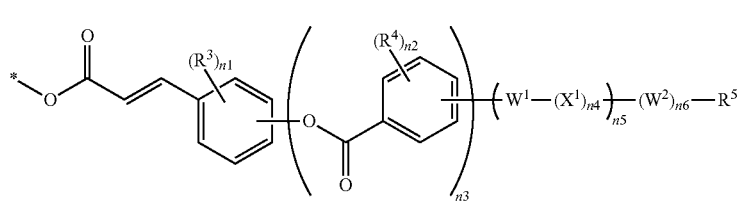

(3-1)

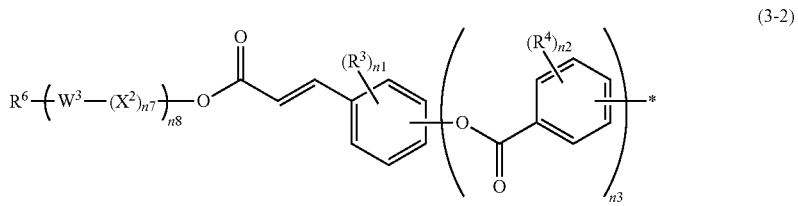

(3-2)

in formula (3-1) and formula (3-2), $R^3$ and $R^4$ each independently represent a $C_1$ to $C_6$ alkyl group, a $C_1$ to $C_6$ alkoxy group, a halogen atom, or a cyano group; $R^5$ and $R^6$ each independently represent a $C_1$ to $C_{40}$ alkyl group or a $C_1$ to $C_{40}$ alkyl group substituted by a fluorine atom; $W^1$, $W^2$, and $W^3$ each independently represent

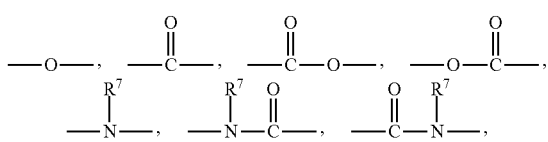

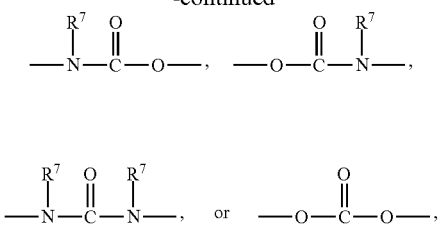

wherein $R^7$ represents a hydrogen atom or a $C_1$ to $C_4$ alkyl group; $X^1$ and $X^2$ each independently represent a methylene group, an arylene group, a divalent alicyclic group, —Si(CH$_3$)$_2$—, —CH=CH—, —C≡C—, a methylene group having a substituent, an arylene group having a substituent, a divalent alicyclic group having a substituent, —Si(CH$_3$)$_2$— having a substituent, or —CH=CH— having a substituent, wherein the substituent is a cyano group, a halogen atom, or a $C_1$ to $C_4$ alkyl group; n1 and n2 each independently represent an integer of 0 to 4; n3 represents an integer of 0 or 1; n4 and n7 each independently represent an integer of 1 to 6; n5 and n8 each independently represent an integer of 0 to 2; n6 represents 0 or 1; and * each independently represents a bonding position.

3. The liquid crystal alignment agent of claim 1, wherein based on the tetracarboxylic dianhydride compound (a) as 100 mole, an amount of the tetracarboxylic dianhydride compound (a-1) is 5 mole to 50 mole.

4. The liquid crystal alignment agent of claim 1, wherein based on the diamine compound (b) as 100 mole, an amount of the diamine compound (b-1) having a structure of formula (2) is 3 mole to 20 mole, and an amount of the diamine compound (b-2) having a structure of formula (3) is 10 mole to 80 mole.

5. A liquid crystal alignment film formed by a liquid crystal alignment agent of claim 1.

6. A liquid crystal display element comprising a liquid crystal alignment film of claim 5.

* * * * *